United States Patent [19]
Yevick

[11] 3,995,288
[45] Nov. 30, 1976

[54] COMPACT FOLDED MIRROR CAMERA AND PROJECTOR

[75] Inventor: George Johannus Yevick, Leonia, N.J.

[73] Assignee: Izon Corporation, Stamford, Conn.

[22] Filed: Oct. 20, 1975

[21] Appl. No.: 624,257

[52] U.S. Cl. ............................. 354/77; 353/27 R; 353/30; 353/38; 354/120
[51] Int. Cl.² ......................................... G03B 17/54
[58] Field of Search ............ 354/77, 110, 111, 115, 354/118, 120, 122, 125; 353/27 R, 30, 38

[56] References Cited
UNITED STATES PATENTS

| | | | |
|---|---|---|---|
| 3,387,547 | 6/1968 | Houghton | 354/125 |
| 3,864,034 | 2/1975 | Yevick | 353/120 |
| 3,865,485 | 2/1975 | Yevick | 354/110 X |
| 3,950,769 | 4/1976 | Yevick | 354/120 X |

*Primary Examiner*—Joseph W. Hartary
*Attorney, Agent, or Firm*—Thomas J. Greer, Jr.

[57] ABSTRACT

An apparatus for use as both a camera and a viewer. As a camera, light from an object is broken up by a planar array of N lenses into N identical images which fall onto an opaque scene mask. A small aperture lies within each image, but at a different relative zone so that the apertures are non-homologous with respect to the image. The scene mask carries a lens projection adjacent each aperture. A field stop plate is provided with openings which are aligned with those of the scene mask. When used as a camera, light passes through the objective lenses and the two sets of aligned apertures and strikes virgin photographic emulsion. The emulsion is indexed and the process repeated for the next object. After emulsion development, the lensfiche is sequentially illuminated from the rear and each object (macroscene) sequentially reconstructed by projection on a viewing screen. For projection, the developed emulsion is illuminated after turning it about a vertical axis 180°, and the scene mask moved laterally in its own plane so that the lenses carried by the scene mask are now in the several optical paths and the scene mask openings play no role.

5 Claims, 46 Drawing Figures

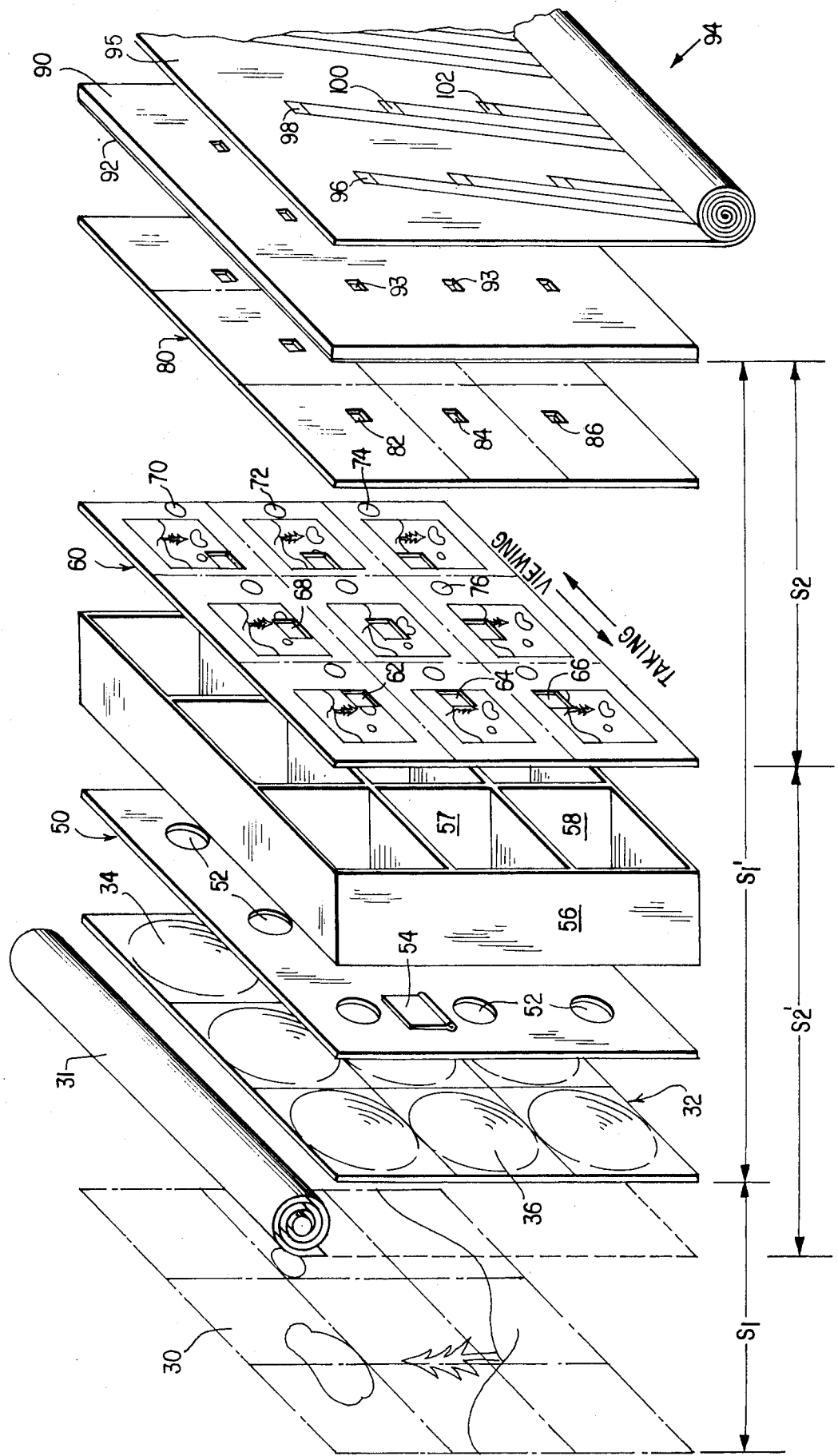

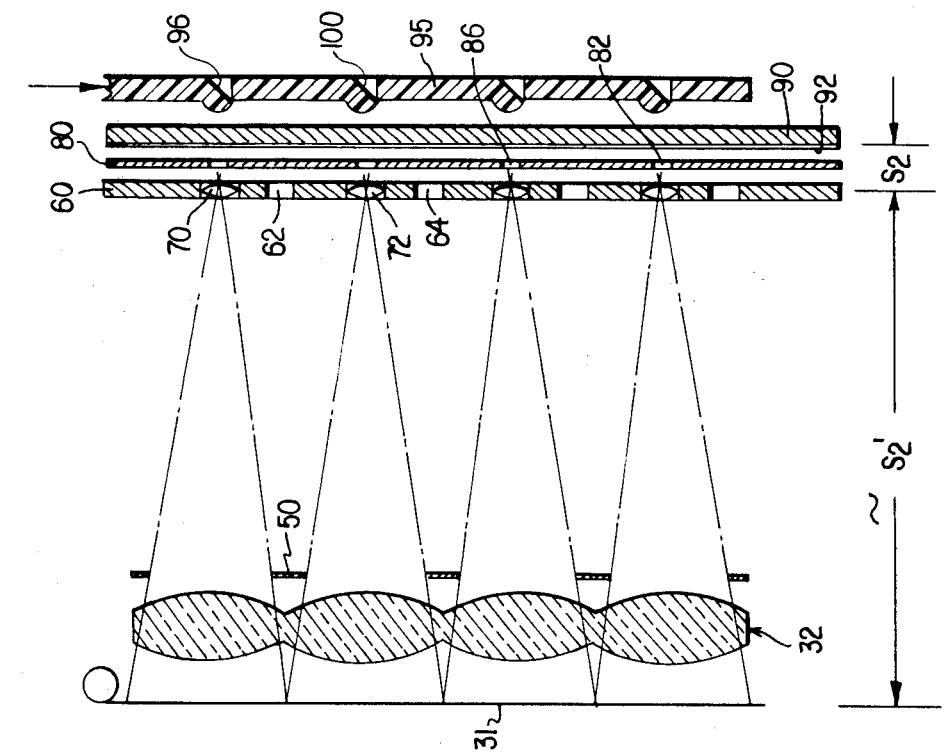

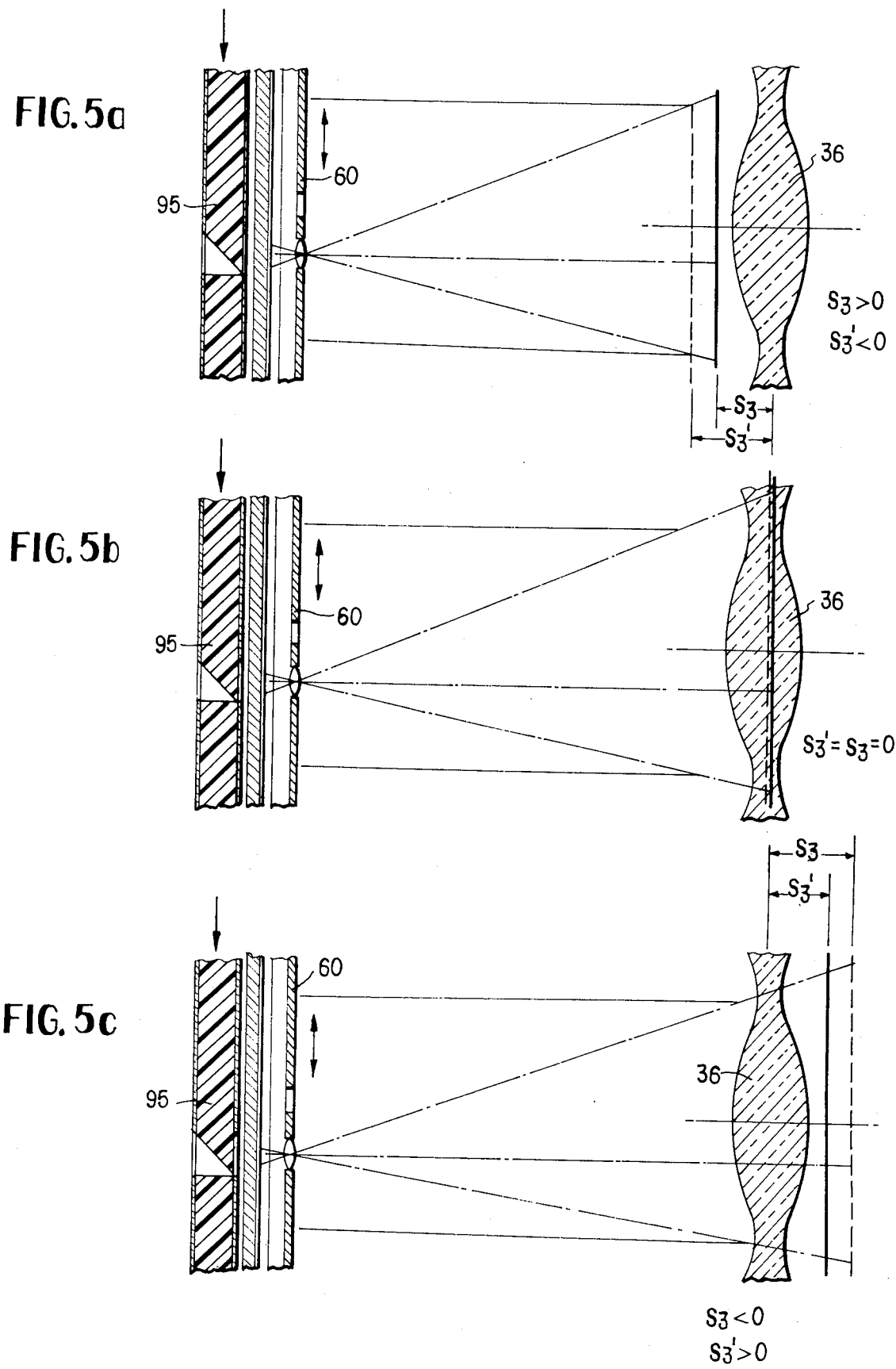

FIG. 25
FIG. 27
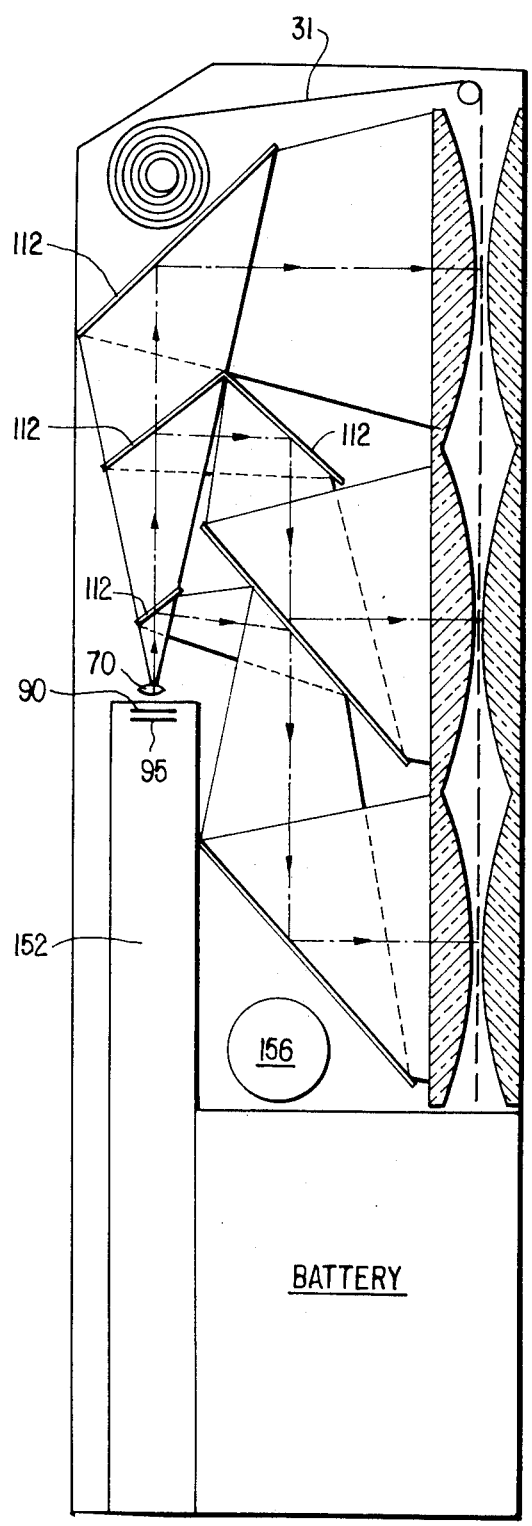
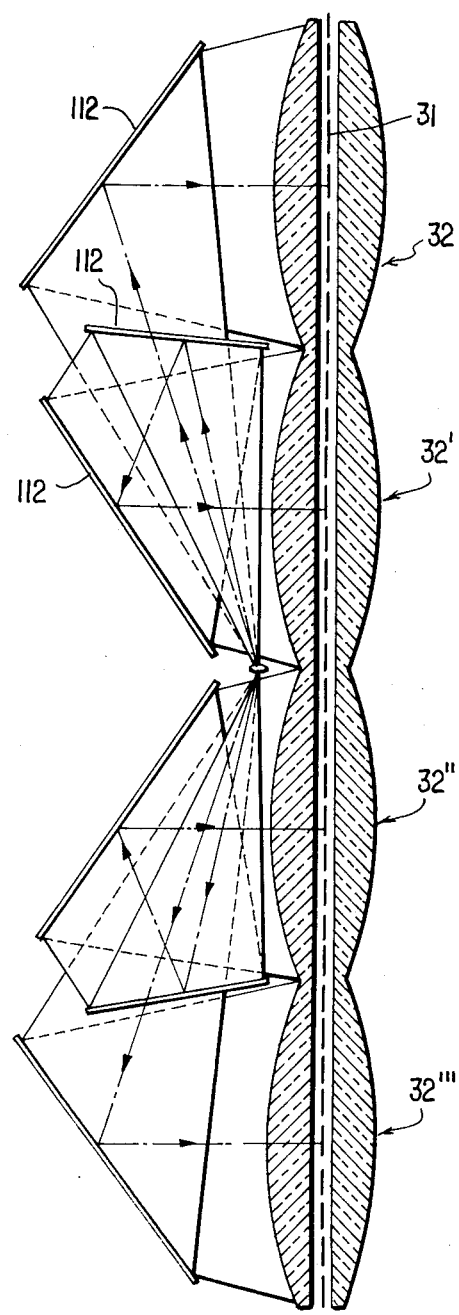

FIG. 30a
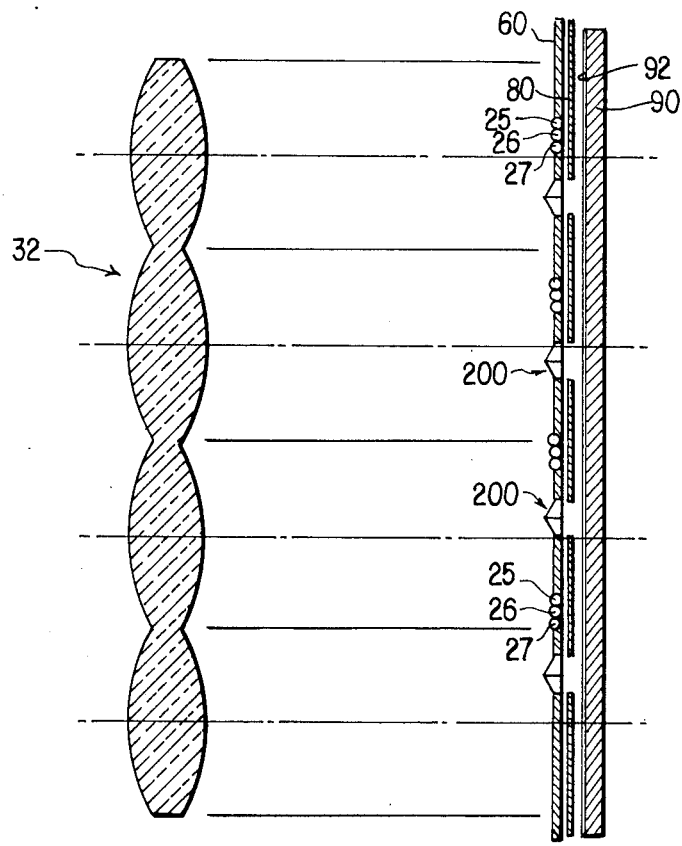
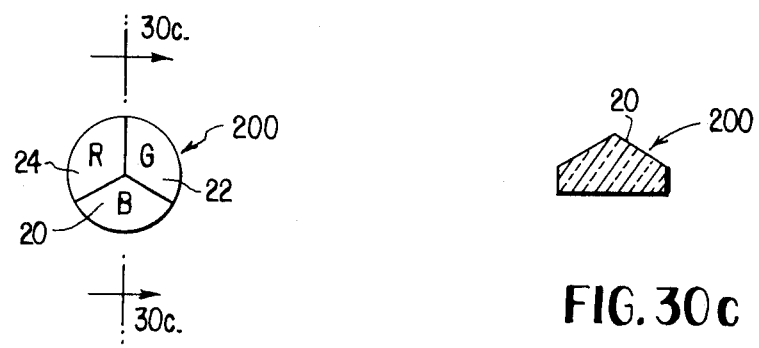
FIG. 30b
FIG. 30c

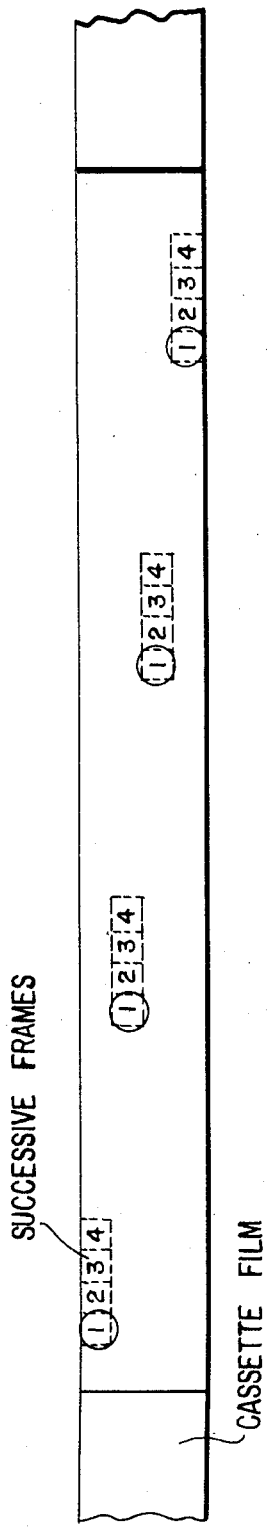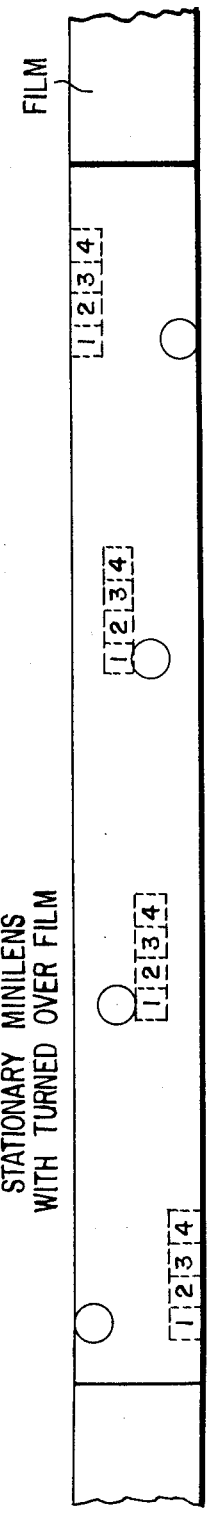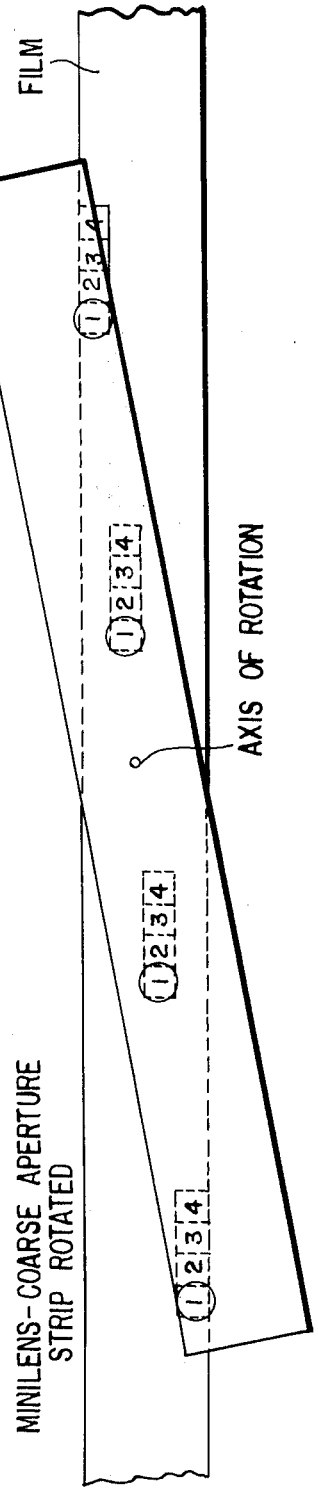

COMPACT FOLDED MIRROR CAMERA AND PROJECTOR

This invention relates to an optical device exhibiting utility both as a recording device (a camera) and as a readout device (a projector). The device employs several of the elements disclosed in my co-pending U.S. patent application Ser. No. 515,343, filed Oct. 16, 1974, now U.S. Pat. No. 3,950,769 and entitled "Compact Camera and Viewing Apparatus", hereby incorporated by reference. This invention also employs an illuminating sheet for defining a plurality of pin-point sources of illumination for projection of the type disclosed in co-pending application Ser. No. 536,409, entitled "Point Array Sheet Lighting Apparatus" by Lawrence W. Grunberger, commonly assigned, and hereby incorporated by reference.

According to the practice of the present invention, a compact large area camera and projector is defined which employs lenses having a radius of between 50 and 150 mils, in distinction to the relatively small lenses employed in my U.S. Pat. No. 3,864,034. In accordance with the practice of this invention, an apparatus similar to that shown in my co-pending application Ser. No. 515,343 is employed. However, instead of a microfiche element such as shown in my U.S. Pat. No. 3,864,034, lenses of an appreciably larger diameter are used to thereby effect economies in manufacture. In accordance with the practice of this invention, I may employ as a light-receiving element a planar and transparent substrate carrying a photographic emulsion. I may also employ a cassette of the well-known Philips type defined by two spools having the ends of a narrow and elongated strip of photographic film attached to them.

IN THE DRAWINGS

FIG. 1 is an exploded view of the camera and viewer apparatus of this invention, according to one embodiment.

FIG. 2 is a view of the elements of FIG. 1 shown in the assembled state, the device being employed as a camera.

FIG. 3 is a view similar to FIG. 2, but shows the device when in use as a projection apparatus.

FIGS. 5a, 5b, 5c illustrate three different locations for a certain rear projection screen of the apparatus shown at FIG. 1.

FIg. 25 is a typical cross-section of the upper portion of the apparatus of FIG. 24.

FIG. 27 is a typical cross-sectional view of the upper portion of the apparatus of FIG. 26 and illustrates certain optical arrangements.

FIGS. 30a, 30b, 30c illustrate, partially schematically, tetrahedral prisms for yielding color in the use of black and white film.

Figure 32:
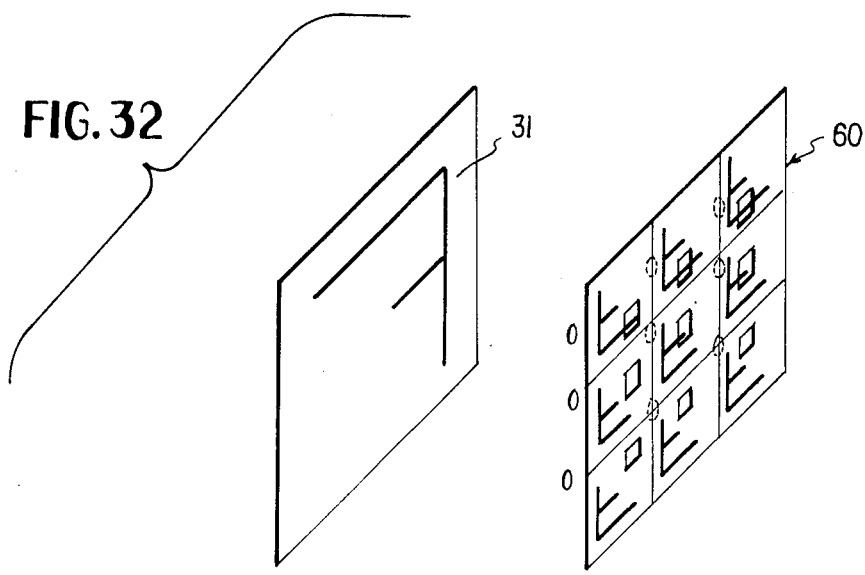

FIG. 32 further illustrates the effect of rotation on the microfiche on the projected image.

FIGS. 33a, 33b, 33c illustrate the effect of turning over a film strip in order to obtain desired projection on the viewing screen.

Figure 34:
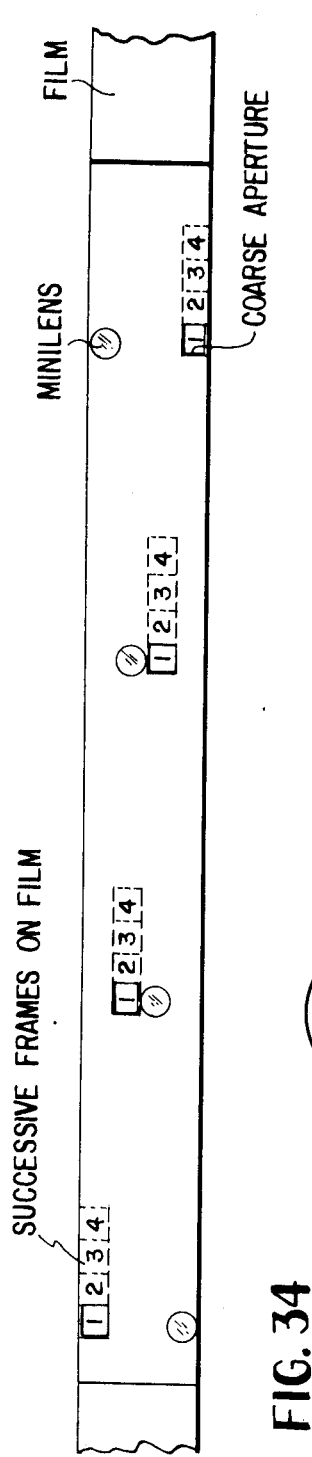

FIG. 34 is a view similar to FIG. 33 and illustrates the correct arrangement of the minilenses and coarse apertures when a Philips-type cassette film is employed.

Figure 35:
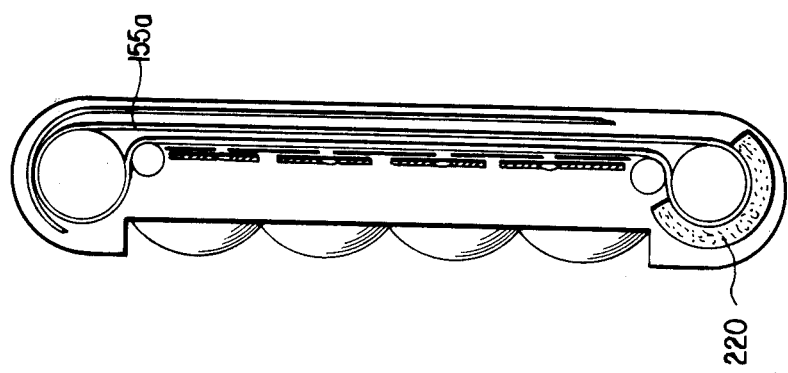

FIG. 35 is a partially schematic cross-sectional view showing the use of a rapid photographic-emulsion development device in combination with the apparatus of this invention.

Figure 36:
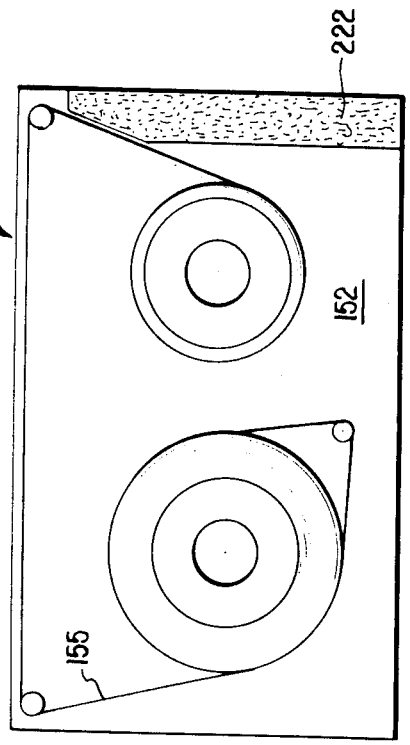

FIG. 36 is a view illustrating a monobath in combination with a Philips-type cassette apparatus of this invention, for the purpose of rapid development and viewing of exposed film.

Figure 37:
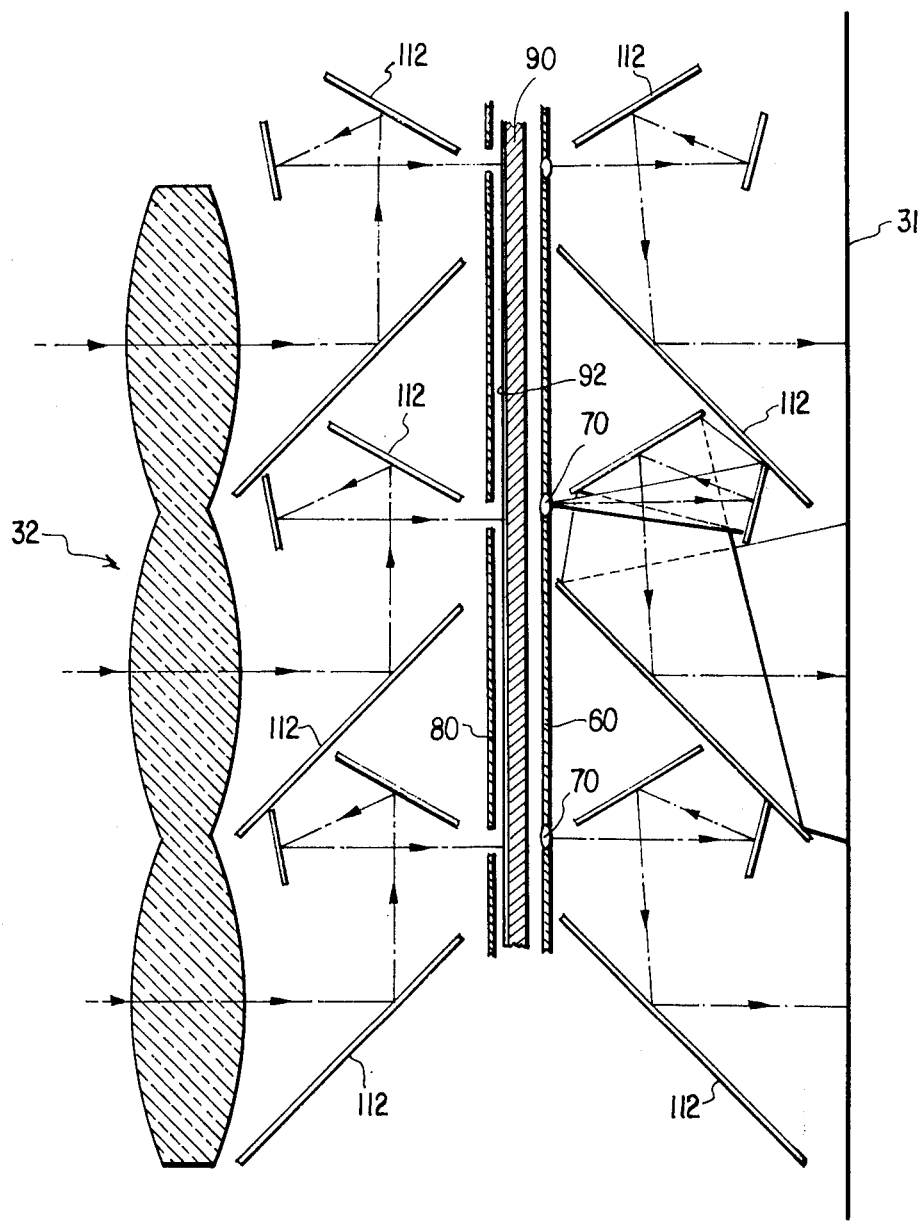

FIG. 37 is a partially schematic cross-section showing the use of mirrors for folding light cones in a direct-through path from a large lens array to a viewing screen.

Referring now to FIG. 1 of the drawings, the numeral 30 denotes a macroscene and it is here illustrated as some distance from the camera although it may be placed directly against the front of the camera. Numeral 31 denotes a rear projection viewing screen which may be rolled up or down, as in the case of a common window shade. As will later become apparent, when the apparatus functions as a camera the viewing screen 31 is rolled up and when the device is used as a projection apparatus the screen 31 is rolled down. Numeral 32 denotes a generally rectangular array of lenses, two such lenses being denoted by the numerals 34 and 36. These lenses may be termed objective lenses and may be formed in any convenient manner from either glass or a suitable plastic such as polymethylmethacrylate.

The numeral 50 denotes an aperture and a shutter plate having a plurality of apertures 52, each of which is supplied with a shutter schematically indicated by the numeral 54. The apertures 52 are in general coincidence with the optic axes of the lenses of array 32, with a single aperture 52 corresponding to a single lens in array 32. It will be understood that each aperture 52 is provided with a shutter, the shutters being so coupled that they operate in synchronism. The numerals 56 denotes a speta member defined by a plurality of intersecting, opaque strips, the strips defining open-ended cells such as 57 and 58. In general, the objective lenses, the apertures 52, and the cells in septa member 56 are, respectively, optically aligned. The numeral 60 denotes a minilens-and-coarse-aperture plate having a plurality of generally rectangular apertures 62, 64, 66, 68, etc. The plate is also provided with a plurality of minilenses 70, 72, 74, 76, etc. The reader may imagine the opaque plate 60 to be divided into a plurality of rectangular zones (nine are illustrated), with each zone being the same size. During operation in the camera phase, when the shutters are opened, the object 30 is seen by each of the large lenses 34, 36, etc., such that a smaller and inverted image of the object 30 falls on the left face of plate 60. For purposes of illustration, these smaller images have been shown on the right space of plate 60. The openings 62, 64, 66, 68, etc., are non-homologously placed with respect to each of the images such that each opening 62, etc., transmits only a portion of the image. If all of the openings 62, 64, etc. were placed together in the same manner, the total area would equal one of the images on plate 60. This manner of breaking down each image into sub-images is completely similar to that as set out in my co-pending application Ser. No. 515,343. It will be noted that the minilenses 70, 72, etc., however, do not lie within the area of the several images. Each minilens may be regarded as associated with its own image.

The numeral 80 denotes a fine-aperture and field-stop plate which is provided over its area with a plurality of openings 82, 84, 86. Each of these latter openings is aligned with a respective one of the openings 62, 64, etc., of plate 60. The numeral 90 denotes a fiche of a transparent material, such as the plastic polymethylmethacrylate and is provided on its front surface with a photographic emulsion 92.

The numeral 94 denotes in general a lighting apparatus of the type shown and described in said copending application Ser. No. 536,409 by Lawrence W. Grunberger. The device includes a sheet 95 of a transparent plastic material such as polymethylmethacrylate and which has been treated on both sides to make it totally internally reflecting. Such a sheet will be termed a Grunberger sheet. A plurality of dispersed internal reflecting surfaces 96, 98, 100, 102, etc., are positioned over the area of the Grunberger sheet 95 for the purpose of providing point sources of illumination at right angles to the sheet. The details of construction of light source 94 are not important for an understanding of this invention and further description will not be given.

From the above, the reader will now be able to follow the following explanation of how the apparatus is employed both as a camera and as a projection apparatus. In using the apparatus as a camera, as shown at FIG. 2, the viewing screen 31 is rolled up so that the objective lenses of plate 32 receive light from an object 30. The shutter mechanism is now activated to thereby permit light to pass through each of the apertures 52 in shutter plate 50, passing through the cells 57, 58, etc., of septa member 56, with the attendant formation of an image on each of the nine zones of minilens and coarse aperture plate 60. Again, the reader will recognize that in practice the images are formed on the front or left face of the plate and would not be visible in the perspective shown at FIG. 1. The images are shown on the right face for purposes of illustration. The apertures 62, 64, etc., are non-homologously placed with respect to each of the identical images such that the effect is to break up the images into sub-images. The sub-images now pass through aligned openings 82, 84, etc., on opaque stop 80 and onto the photographic emulsion 92. This completes the taking of one scene. The fiche 90 is now indexed so as to align a fresh portion thereof with respect to the openings 82, 84, etc., of plate 80. The apparatus is now positioned to take a different scene and the shutter mechanism actuated so as to open the shutters 54, the process being repeated. The taking process continues until such time as all of the emulsion areas are exhausted at which time the fiche 90 is removed from the apparatus and the emulsion photographically fixed, i.e., developed.

The fiche 90 is now placed back into the apparatus, with the emulsion 92 facing the right instead of the left, as shown at FIG. 1. In other words, after re-insertion, the fiche 90 has been turned 180° about a vertical axis with respect to the illustrated position at FIG. 1.

Referring now to FIG. 2 of the drawings, the elements of FIG. 1 are shown in their assembled relation. FIG. 2 illustrates the position of the elements in the taking or recording stage. In this phase, the Grunberger lighting sheet 95 is quiescent and performs no function. It will be further noted that the minilens elements 70, 72, etc., of plate 60 play no role.

Referring now to FIG. 3 of the drawings, the reader will note that the rear projection viewing screen 31 has been rolled down and that the Grunberger sheet 95 now plays an active role. The reader will also note that the coarse aperture plate 60 has been moved laterally so that the minilenses 70, 72, etc., are now aligned with apertures 82, 84, 86, etc., of fine aperture plate 80. The openings 62, 64, etc., of aperture plate 60 play no role during projection and no light passes through them in this phase. The Grunberger lighting sheet is illuminated and each of its point sources 96, 98, 100, etc., project light through a corresponding microimage on developed emulsion 92, the light passing through an aperture 82, 84, 86, etc., of plate 80 and through a corresponding minilens. From here, light passes through the open shutters 54 and hence through apertures 52 of plate 50 and to the lenses of plate 32 for projection on the rear of viewing screen 31. The screen being translucent, the human viewer, looking toward the right in FIG. 3, sees the re-assembled scene.

In the taking process, the film 92 is located at or close to the focal plane of the large objective lenses of plate 32. Upon projection or readout, the minilenses form the final congruent image on the rear projection viewing screen, with the large objective lenses playing little or no role because they have low or zero power compared to that of the minilenses. Indeed, the large objective lenses can be designed such that in combination with the minilenses, the image on the rear projection screen can be improved over that which would be obtained if minilenses alone were employed.

FIGS. 5a, 5b, 5c show three cases. In the first, the viewing screen is in front of the objective lens plate 36, in the second case the screen may be in the middle of the plate (the plate being thus formed of two portions which sandwich the screen) and the third case treats of the viewing screen as behind the objective lens plate.

Figure 4:
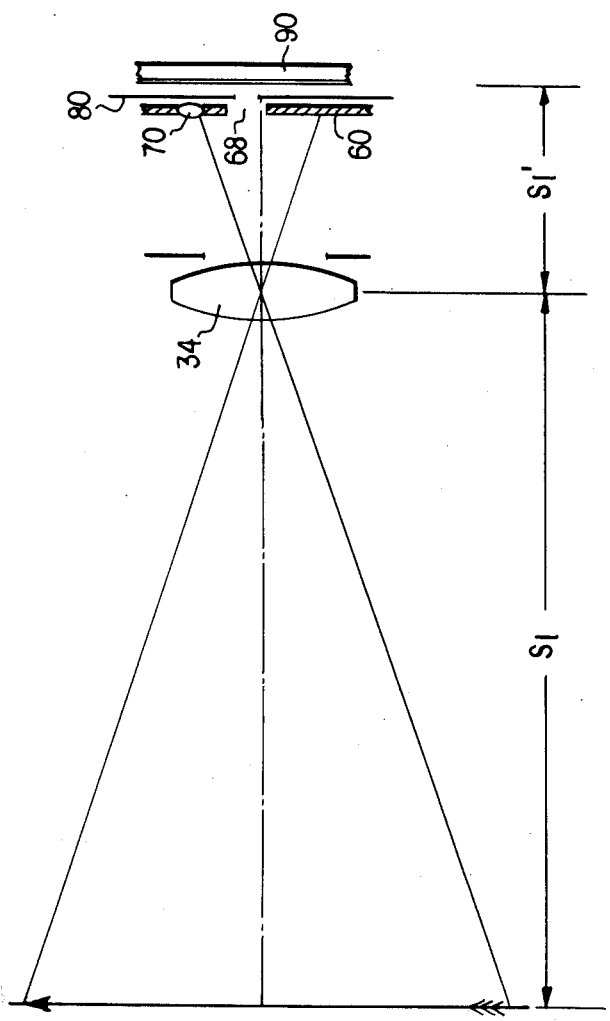
FIG. 4 is a view of a typical single lens element and associated parts and shows certain parameters employed in certain mathematical formulae.

In order to make plain the following analysis of these three cases, the attention of the Examiner is invited to FIG. 4 of the drawings wherein certain parameters are illustrated.

Let the image formed by a minilens be positioned a distance $S_3$ from an objective lens. Let the final image (the image formed by an objective lens) be positioned at a distance $S_3^1$ from an objective lens. The rear projection screen must be placed at a distance $S_3^1$ from an objective lens. Now $S_3^1$ is given by the well known simple lens formula $$S_3^1 = \frac{f_1 S_3}{S_3 - f_1}$$

where $f_1$ = focal length of the objective lens.

The focal length of the minilens is so chosen that $S_3$ is small compared to $f_1$ $$S_3^1 = \frac{S_3}{\frac{S_3}{f_1} - 1} = -S_3 \left(\frac{1}{1 - \frac{S_3}{f_1}}\right)$$

$$\approx -S_3 \left(1 + \frac{S_3}{f_1}\right)$$

$$\approx -S_3 \frac{-S_3^2}{f_1}$$

Hence, if the image positioned at $S_3 = 0$, then the screen must be at $S_3^1 - 0$ (case of FIG. 5b).

Note that if $S_3$ is small, then $S_3^1$ will also be small.

If $S_3$ is positive (see FIG. 5c), i.e., to the left of the large lens array, then $S_3^1$ is negative (to the left of the large lens array) and when the rear projection screen is at $S_3$, an enlarged virtual image which will appear to be located at distance $S_3 + S_3^2$ is back of the large lens. The magnification taking place or produced by the large lenses will be $$\left|\frac{S_3^1}{S_3}\right| = \frac{S_3 + S_3^2/f_1}{S_3} = 1 + \frac{S_3}{f_1} \approx 1$$

Hence, the fine field stops at slate 80 must be chosen to provide the proper congruence of the virtual images.

In FIG. 5a, if $S_3$ is negative, the image formed by the minilens lies to the right of the large lens array and serves as an object for the large lenses. The position of the rear image is given by $S_3 \approx |S_3| - S_3^2 /f_1$, if $f_1$ is chosen positive, as would usually be the case. Hence, the screen is located to the right of the large lenses as shown in FIG. 5a at a distance $$|S_3| - \frac{S_3^2}{f_1}$$

to the right of the large lenses. The final image, of course, is slightly reduced by the action of the large lenses and the reduction is given by $$\left|\frac{S_3^1}{S_3}\right| = 1 - \frac{|S_3|}{f_1} \approx 1$$

Most rear projection screens are highly angularly dependent in the sense that they scatter light most strongly into the direction of travel of the incident light. Hence, for the cases illustrated in FIGS. 5a and 5b, the apparent brightness of the final image seen by an observer viewing along a line perpendicular to the screen is intensified because of refraction, by the lenses, of light traveling toward the screen into a direction that is more nearly perpendicular to the screen. The effect of this enhancement is most noticeable near the edges of the large lenses. Furthermore, the large objective lenses allow improvement of the quality of the final image on the screen by incorporating the overall qualities of both large lenses and minilenses in order to maximize performance.

In the embodiment of FIG. 1 an opening in plate 60 is optically aligned with a corresponding opening in field stop 80 in the camera phase while in the viewing or projection phase, a minilens is aligned with a corresponding opening in the fine aperture of plage 80. Thus, a lateral motion of the coarse aperture plate 60 is required between the camera and the viewing phase.

FIG. 4 illustrates the relation between the object distance $S_1$, the image distance $S_1^1$, and several elements of the apparatus of FIG. 1 when employed in the camera phase.

FIGS. 5a, 5b, and 5c illustrate different rear projection viewing screen positions with respect to the objective lens plate 32. At FIG. 5a, the viewing screen 31 is positioned between the objective lenses and the scene mask 60. At FIG. 5b the viewing screen is positioned medially of the objective lens plate, the latter being in two sections. At FIG. 5c the viewing screen is positioned beyond the objective lens plate.

Figure 6B:
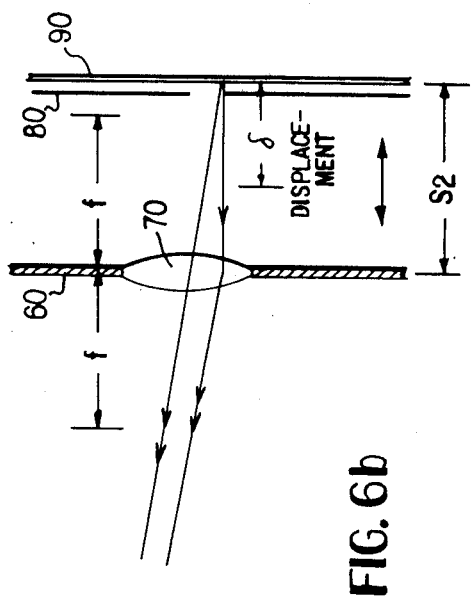
FIGS. 6a, 6b illustrate an embodiment wherein the coarse openings in the scene mask are omitted and the scene mask lenses moved axially between camera and projector positions.
Figure 6A:
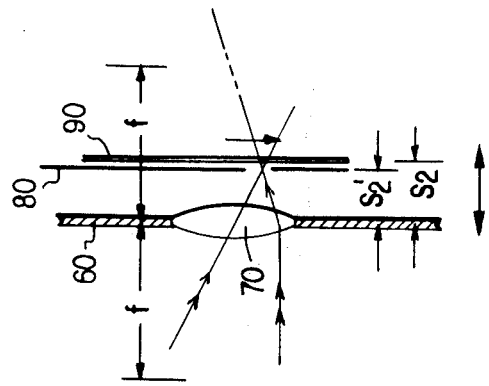

FIGS. 6a and 6b illustrate an embodiment wherein plate 60 does not carry apertures; rather, it carries minilenses only. The object 30 in this embodiment is nonetheless dissected or divided up by virtue of the apertures 82, 84, 86, etc., on the fine aperture plate 80. It will be recalled that these apertures are also staggered or non-homologous relative to each of the sub-images. Placing minilens elements such as 70 in optical alignment with the openings in plate 80, in both the camera and in the projection phases, is carried out with this embodiment. It is, however, necessary to adjust plate 60 in a direction towards and away from objective lens plate 32 in passing between the recording and viewing phases.

FIG. 6a shows the optical arrangement in the camera or recording phase. For simplicity it is assumed that each minilens 70 is a simple positive lens of focal length $f_2$. The photographic emulsion must be positioned at the plane of a real image formed by the combination of an objective lens and a minilens. The large lens forms an image which is located at distance $S_2$ with respect to the minilens. (In FIG. 6a, the distance $S_2$ shown is negative by the usual sign convertion employed in simple-lens equations).

The image distance from the minilens is given by $$S_2' = \frac{S_2}{\frac{S_2}{f_2} - 1}$$

There is a reduction in the final image plus a shortening of the throwing distance by an amount $S_2 - S_2'$. Hence, the emulsion is positioned at $S_2'$. It is essential that the aperture of the minilens accommodate the entire image which is associated with its fine aperture stop.

In the viewing phase, see FIG. 6b, the emulsion must be moved with respect to the minilens or vice-versa by an amount $\delta$ in order to project the image onto the screen. If the minilens were not moved with respect to the film, the final image position in the viewing phase would be located at the position previously occupied by the initial scene object during the camera or taking phase.

The analysis of the movement depends entirely upon the placement of the screen, namely in front of the large lens, $S_3 < 0$, in the large lens array $S_3 \simeq 0$, or inside, $S_3 > 0$. The analysis is elementary and included for the sake of completeness. Let the distance between large lens array and minilens array during projection be represented by W. Then the desired magnification $M_2$ produced by the minilens alone is given by $$|M_2| = \frac{W - S_2}{S_2' + \delta}$$

with $$W - S_3 = (|M_2| + 1) f_2$$

hence $$S_2' + \delta = \frac{(|M_2| + 1)}{|M_2|} f_2$$

Therefore, $$\delta = (1 + \frac{1}{|M_2|}) f_2 - S_2' \simeq f_2 - S_2'$$

In short, the emulsion is positioned slightly beyond the focal point.

The overall magnification of the system is given by $$M = M_1 M_2 \simeq M_2$$

where $$|M_1| = \left|\frac{S_2}{S_2}\right| \simeq 1$$

Figure 7:
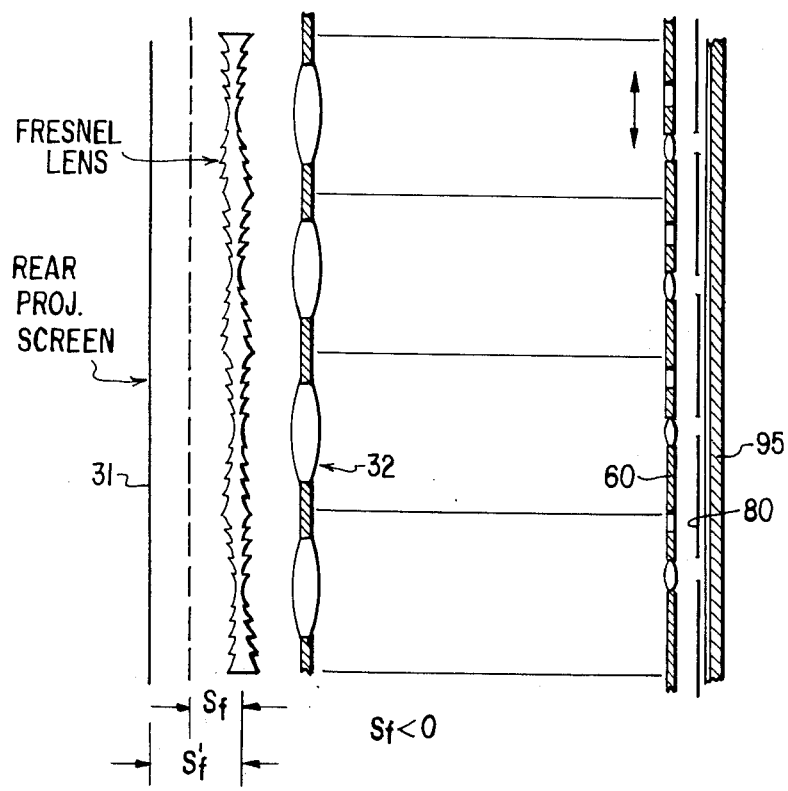
FIG. 7 is a partially schematic view similar to FIG. 2 and illustrates the use of a flexible fresnel lens sheet used in conjunction with a rear projection screen.

Referring now to FIG. 7 of the drawings, the numeral 110 denotes a flexible Fresnel lens which is rolled up and down in conjunction with flexible rear projection screen 31. The flexible Fresnel sheet 110 is positioned between the rear projection screen and the large array 32 of objective lenses. It will be understood that the Fresnel lens is employed only at the time the rear projection screen is employed, i.e., in the viewing stage. The Fresnel lens sheet 110 possesses the property of forming a real enlarged image between it and the rear projection screen 31. One advantage of the Fresnel lens is the achievement of a redundancy which can be of importance in positioning accuracy and in correcting the effects of optical misalignment due to environmental fluctuation. This follows from the fact that light cones impinging upon the rear projection screen may be made to overlap.

Let $S_f$ represent the position, with respect to the Fresnel sheet, of the final image after passing through the large lens array. This image now acts as object for the Fresnel lenses. In FIG. 7, $S_f$ is negative. Hence, the final image position $S_f'$ where the screen will be located is given by $$S_f' = \frac{|S_f|}{1 - |\frac{S_f}{f_f}|} = |S_f|(1 + |\frac{S_f}{f_f}|) \quad S_f' = \frac{|S_f|}{\frac{|S_f|}{f_f} + 1}$$

where $f_f$ is the focal length of the Fresnel lens. Hence, the magnification introduced by the Fresnel lens is given by $$\frac{S_f'}{S_f} = M_f = 1 + \frac{S_f}{f_f} \geq 1 \quad M_f = \frac{-S_f'}{S_f} = \frac{-S_f'}{-|S_f|} = \frac{S_f'}{|S_f|}$$

$$= \frac{1}{\frac{|S_f|}{f_f} + 1}$$

which is greater than one if $f_f$ is negative.

If the Fresnel curtain 110 has a focal length equal in magnitude but opposite in sign compared to the large lenses 34, 36, etc., the effect will be to negate the large lenses. Accordingly, the position on the rear viewing screen will coincide with the position of the image produced by the minilenses.

As described in my co-pending, U.S. patent application Ser. No. 515,343, the location and size of the fine-field-stop openings in a mask must be properly determined. In essence, the same techniques are employed with respect to field-stop mask 80 but there are some basic differences, inasmuch as in the read-out phase the minilenses are traversed and are on the same side of the emulsion as the large lens array. A second difference is that the optic axis of a minilens does not coincide in general with the center of the projected scene.

It will be observed that any portion of the nearly-identical large images formed by the object lenses may be selected for the stop apertures 82, 84, etc. A minilens cannot form a large well-corrected image and this is one reason for the use of large objective lenses.

Image portions may be selected such that during projection onto the screen, overlapping of light cones occurs with the result that redundancy of information can be utilized against such problems as creepage, environmental fluctuations, and positioning inaccuracy. The greater the redundancy, the greater the tolerance. A point will, however, be reached at which the half cone angle is too great and distortion sets in with concomitant loss of quality of image. A second objection is that greater redundancy means fewer frames per emulsion area.

Figure 8:
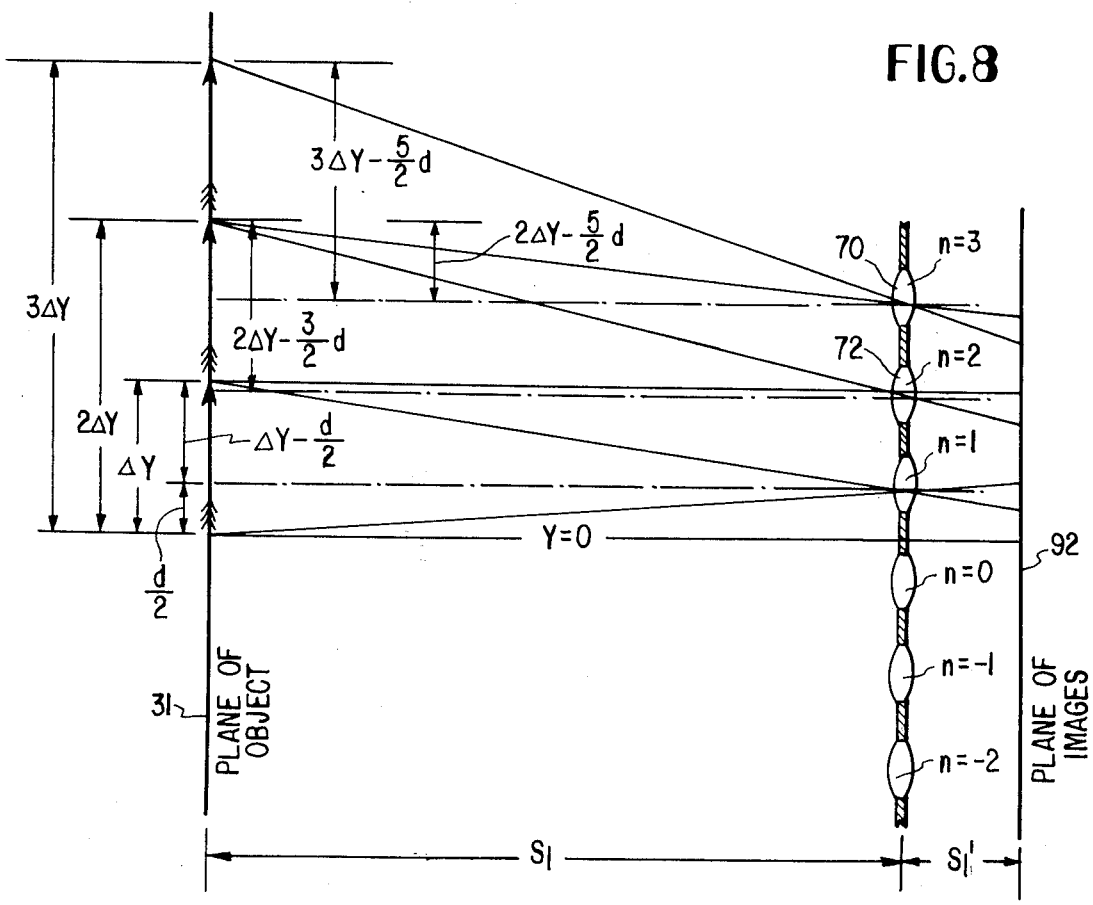
FIG. 8 is a schematic diagram illustrating certain parameters which are required to find the positions of fine field stops located in the fine aperture mask.

The position and size of the fine-aperture openings in mask 80 for the case of a finite object having height H are given as follows. The analysis proceeds as in my copending U.S. patent application Ser. No. 515,343. With reference to FIG. 8, consider one dimension only, say, the y-direction. Let H represent the height of the object seen by lenses located a distance $S_1$ away. Let N represent the number of large lenses. Each lens must provide 1/N of the final image (in the y-direction only) and, therefore, optical information concerning a portion H/N of the total object height must pass through each aperture or fine-field stop.

Therefore, the height $h$ of each opening is given by $$H = M_1 \frac{H}{N} = \frac{S_1{'}}{S_1} \frac{H}{N} = M_1 \Delta Y \qquad (1)$$

Figure 9:
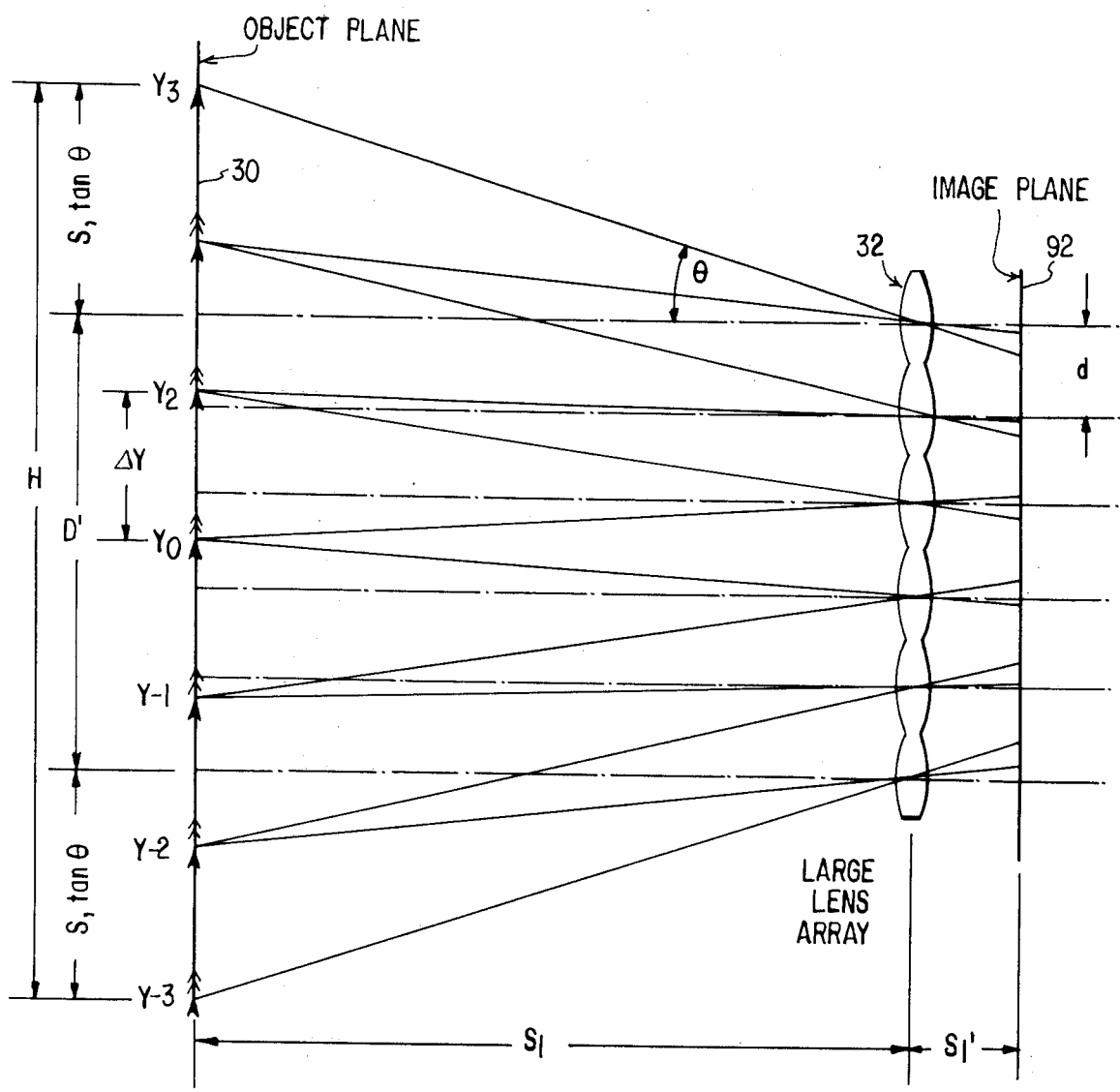
FIG. 9 is a schematic drawing illustrating certain basic relationships between the object and the mini images formed in the emulsion.

From: FIG. 9

$$H = D^1 + 2S_1 \tan \theta \qquad (2)$$

where $\theta$ is the allowed half cone angle for the large lenses.

Hence, $$H = M_1 (D^1 + 2S_1 \tan \theta)(1/N) \qquad (3)$$

where $$D^1 = (N-1)d = D-d \qquad (4)$$

Now H must be remagnified by an amount $M_2$ to a height given by $d$ (assuming no overlap of light cones and $S_3 \leq S_o$ (case of FIG. 5b), i.e., $$d = M_2 H = M_2 M_1 (D^1 + 2S_1 \tan \theta)(1/N) \qquad (5)$$

or solving for $D'$ $$D^1 = \frac{2(N-1)}{N} \frac{M_1 M_2 S_1 \tan \theta}{[1 - \frac{1}{N}(N-1)M_1 M_2]} \qquad (6)$$

The position of the fine apertures or fine-field stops is now determined as follows. Consider N an even number. (The case $N$ = an odd integer easily follows.) Associated with each lens is a portion of the object of an extent given by $$\Delta Y = \frac{D^1 + 2S_1 \tan \theta}{N} = \frac{H}{N} \qquad (7)$$

Hence, the portion of the object associated with the $i^{th}$ lens is $$Y_{i-1} = (i-1) \frac{(D^1 + 2S_1 \tan \theta)}{N} < Y < i$$

$$(D^1 + 2S_1 \tan \theta) = Y_i$$

$$i = -\frac{N}{2} + 1, \ldots -1, 0, 1, 2 \ldots \frac{N}{q} \qquad (8)$$

Knowing the active area of the object assigned to each lens, it becomes relatively easy to calculate the aperture y-coordinates on the scene mask.

The determination is indicated by FIG. 8, in which the optic axis of each large lens is employed as a reference line. Hence, for the $n^{th}$ lens the position of its corresponding aperture on the scene mask is given by $$\frac{(2n-1)}{2} d - M_1 (n\Delta Y - \frac{(2n-1)}{2} d) \leq y$$

$$\leq (2n-1) \frac{d}{2} - M_1 (n-1)\Delta Y - \left\{ \frac{(2n-1)}{2} d \right\} \qquad (9)$$

where $\Delta Y$ is given by Eq. (7) and $d$ by (4).

The quantity $d$ is determined by the manufacturer or lens designer and, in essence, is limited by the maximum cone angle tolerated for aberration. $\Delta Y = (H/N)$ on the other hand, depends upon $S_1$ as shown by Eq. (7). Hence, in addition to focussing the image on the emulsion due to finite distance $S_1$ of the subject, it is necessary to change the size and location of the apertures in the scene mask as explained in my U.S. patent application Ser. No. 515,543.

The height $h$ of the mask openings is given by Eq. (3) Rewriting $h$ $$h = \frac{M_1}{N}(D^1 + 2S_1 \tan \theta)$$

$$= \frac{1}{N} \frac{S_1{'}}{S_1}(D^1 + 2S_1 \tan \theta)$$

$$= \frac{S_1{'}}{N} ( \frac{D^1}{f_1} + 2 \tan \theta ) - \frac{D^1}{N} \qquad (10)$$

$$= d(1 - \frac{1}{N})( \frac{S_1{'}}{f_1} - 1) + \frac{2S_1{'} \tan \theta}{N} \qquad (11)$$

where use is made of the thin lens formula $$\frac{1}{S_1} + \frac{1}{S_1{'}} = \frac{1}{f_1} \qquad (12)$$

Hence, according to Eq. (11) one changes the height of the aperture linearly with the image distance, as discussed in my noted co-pending application Ser. No. 515,343, and the apparatus shown in this patent application shows one embodiment for performing such a requirement.

The analysis here presented in the y-direction applies also to the x-direction and the same formulas obtain. Hence, the problem of size and location of the opening in the scene mask is solved.

Thus far, the camera- or recording-phase operation is almost identical to that of my noted co-pending U.S. patent application, Ser. No. 515,343. Now, however, a change takes place in the viewing phase because each mini-image recorded on the emulsion must now be projected back up through the minilens and through the large lenses and onto the rolled-down screen.

The mini-images on the emulsion are positioned such that in the viewing stage the magnified images just fill the assigned or prescribed area on the rear projection screen.

For purposes of simplification assume that the screen is located in the center of a thin objective lens (FIG.

5b), i.e., $S_3=S_3{}'=0$ and where no overlap is assumed. The general case where $S_3=0$ and overlapping prevails is a straightforward extension and will not be set out.

Figure 10:
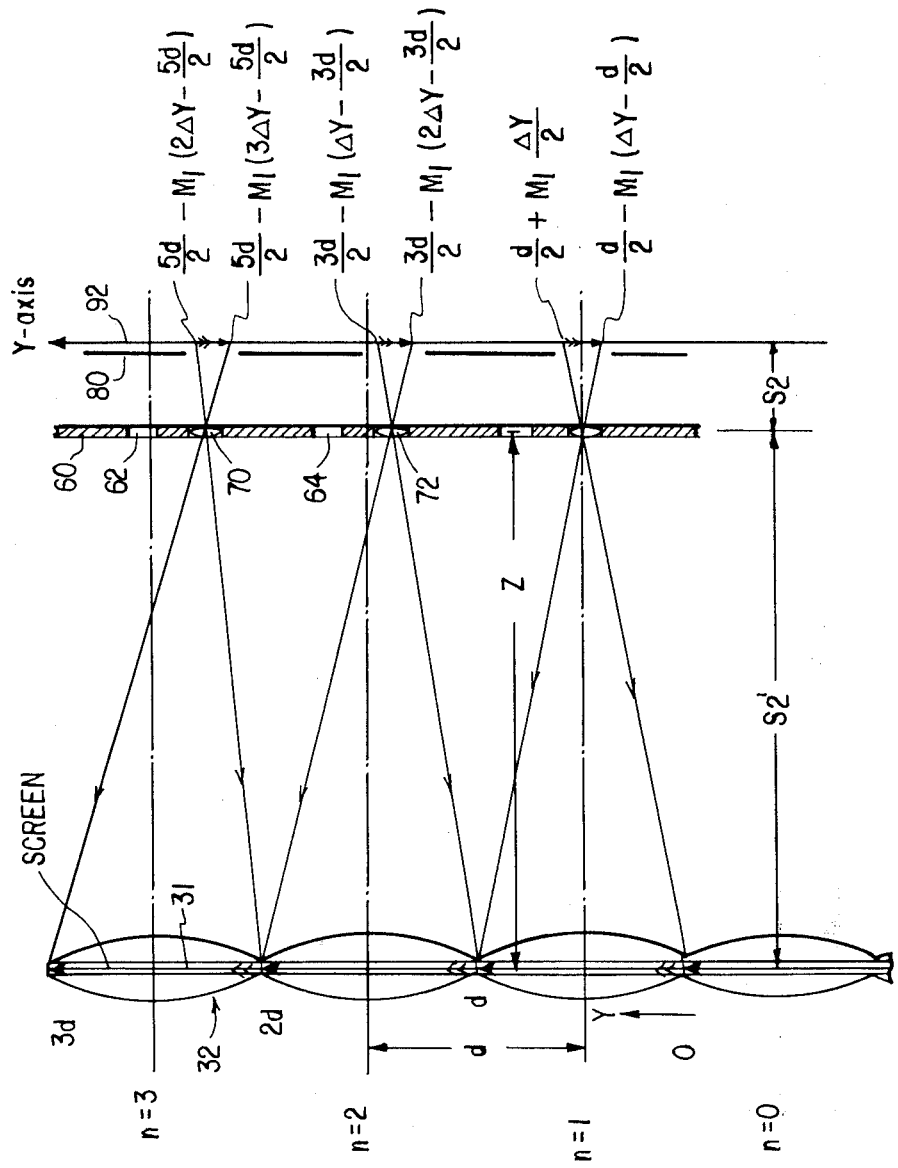
FIG. 10 is a partially schematic view showing certain principal rays which determine the positions of the centers of certain lenses and their magnification.

The center of a minilens is given by the intersection of the two straight lines (see FIG. 10) which connect the corresponding extremities of the mini-object on the emulsion and the projected image on the screen. From FIG. 10, the equations for the straight line are $$y = \frac{[(n-\tfrac{1}{2})d - M_1\{n\Delta Y - (n-\tfrac{1}{2})d\} - nd]}{l} Z + nd \qquad (13)$$

and $$y = \frac{[(n-\tfrac{1}{2})d - M_1\{(n-1)\Delta Y - (n-\tfrac{1}{2})d\} - (n-1)d]}{l} Z + (n-1)d \qquad (14)$$

where $Z=0$ is located at the screen and the distance $Z=l = S_2+S_2{}'$ is the distance between screen and emulsion containing information.

The position of the minilenses is given by equating Eqs. (13) and (14). This yields $$Z = \frac{ld}{d + M_1\Delta Y} = S_2{}' = (|M_2|+1)f_2 \qquad (15)$$

It is seen from Eq. (15) that Z depends upon the size of the image $m_1\Delta Y$ on the emulsion. The height position $y_n$ of the center of the minilens is now given by substituting Eq. (15) into Eq. (13), yielding $$Y_n = nd - [\tfrac{d}{2} + m_1 n \Delta Y + m_1(n-\tfrac{1}{2})d] \frac{1}{1+m_1\Delta Y} \qquad (16)$$

Thus, the position of the minilens must be changed not only in the Z direction, but also in the y-direction as the camera is focussed for different finite distances. This is to be expected because the mini-images have different sizes when observing objects at different distances but the image projected onto the screen by each minilens must always be of the same size, namely, $d$. Now, the magnification is given by $$|M_2| = \left|\frac{S_2{}'}{S_2}\right| \qquad (17)$$

and, clearly, since the size of the image on the emulsion is $m_1\Delta Y$ $$d = m_2 m_1 \Delta Y - m_2 h$$
$$= \left(\tfrac{1}{S_2} - 1\right)\left[\tfrac{2S_1{}'\tan\theta}{n} + d(1-\tfrac{1}{N})(\tfrac{S_1{}'}{f_1}-1)\right] \qquad (18)$$

Solving for $S_2$ yields $$S_2 = l \left[\frac{S_1{}'\left\{\tfrac{d}{f_1}(1-\tfrac{1}{N}) + \tfrac{2\tan\theta}{N}\right\} - d(1-\tfrac{1}{n})}{S_1{}'\left\{\tfrac{d}{f_1}(1-\tfrac{1}{N}) + \tfrac{2\tan\theta}{N}\right\} + \tfrac{d}{N}}\right] \qquad (19)$$

which is of the form $$S_2 = l \left[\frac{aS_1{}' - b}{aS_1{}' + c}\right] \qquad (20)$$

where $$a = \frac{d}{f_1}(1-\tfrac{1}{N}) + \frac{2\tan\theta}{N} \qquad (21)$$

$$b = d(1-\tfrac{1}{N}) \qquad (22)$$

$$c = \frac{d}{N} \qquad (23)$$

The quantities (a), (b), and (c) are fixed by the lens manufacturer. For N large $c \approx d$ and $b \approx d$, hence $$S_2 \approx l\, [1 - \tfrac{b}{aS_1{}'}]$$

Hence, in general, the position of the minilenses are given by Eq. (20). For the case in which N is large and the initial object lies at an infinite distance ($S_1=\infty$), one finds that $S_1{}'=f_1$. Then equating 19 yields $$S_2 \approx l\, \left[\frac{2f_1 \tan\theta}{Nd + 2f_1\tan\theta}\right] \qquad (24)$$

which is, of course, fixed.

There are other relationships to be noted. For a fixed-focus camera, i.e., $S_1 = \infty$, $S_1{}' = f_1$, $$f_1 = S_2 + S_2{}' = l \qquad (25)$$

but $$|M_2| = \left|\frac{S_2{}'}{S_2}\right| \qquad (26)$$

Hence, $$f_1 = S_2(1+M_2) \qquad (27)$$

of $$S_2 = \frac{f_1}{1+M_2} \qquad (28)$$

Substituting Eq. (28) into Eq. (24) yields $$f_1 = \frac{Nd}{2M_2\tan\theta}$$

For example, if $Nd = 4$ inches, $M_2 = 25$, and $\theta = 14°$, Then $$F_1 = \frac{4}{SO \tan 14°} = 0.32'' \approx 8 \text{ mm}.$$

Figure 11:
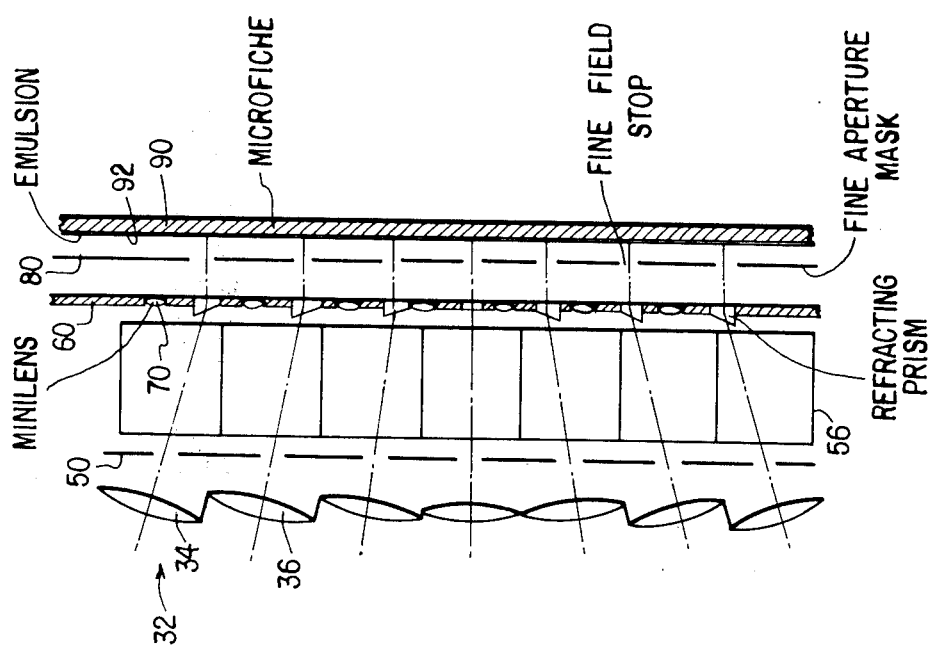
FIG. 11 is a schematic view illustrating the use of a tilted objective lens array with small prisms for a mini lens plate.
Figure 13:
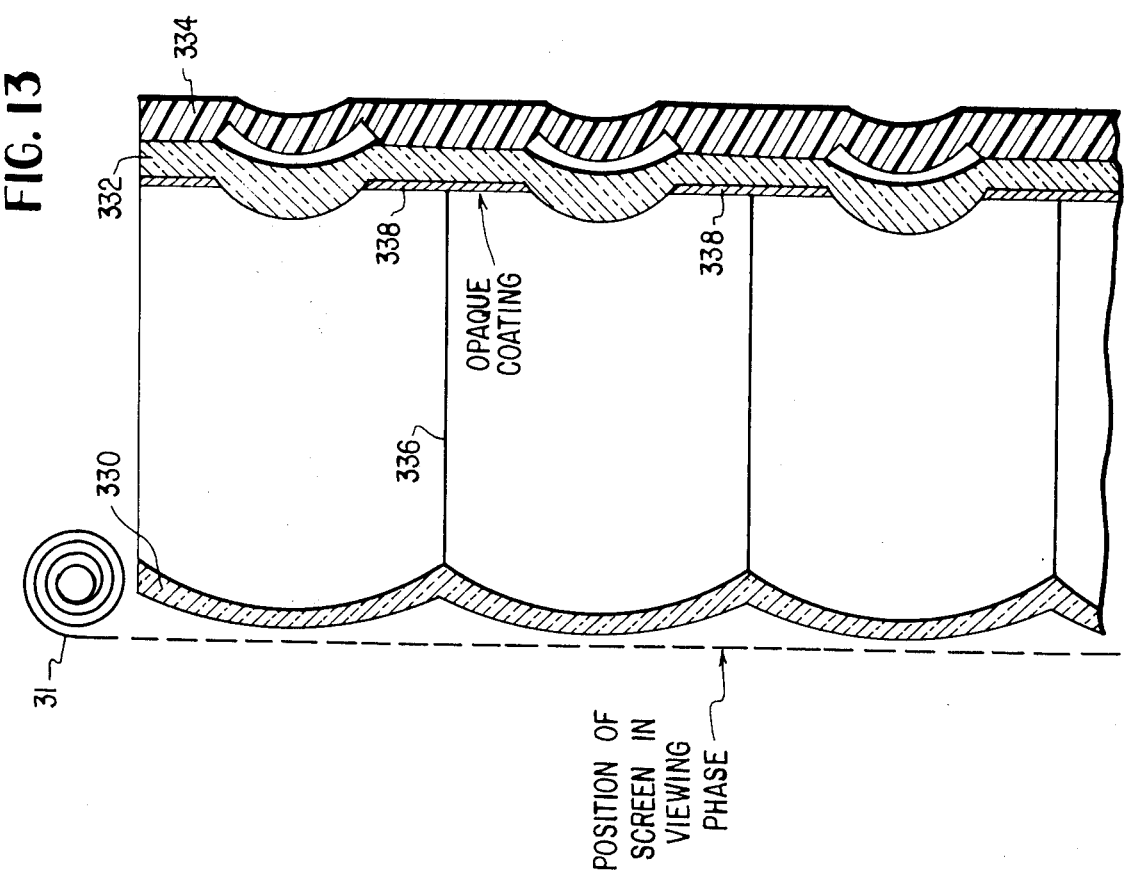
FIG. 13 is a view similar to FIG. 12, but shows a telephoto large lens array.

Referring now to FIG. 11 of the drawings, an embodiment is illustrated, similar to that shown in FIG. 13 of my co-pending application Ser. No. 515,343, wherein the objective lenses of plate 32 are each tilted so that the axis of each objective lens coincides with a fine-field-stop aperture, or with the optic axis of a respective minilens. In FIG. 11, the plate 60 is shown as provided with small prisms 61 so that the tilted objective lenses have their optical axes in a fixed relation with each corresponding prisms and the emulsion accordingly receives light at right angles to its surface.

Figure 12:
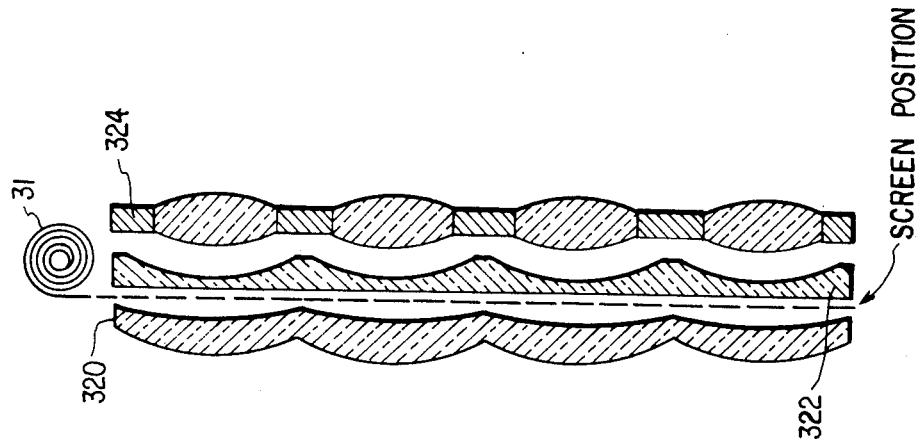
FIG. 12 is a partially schematic cross-sectional view illustrating a tiplet objective lens array.
Figure 14:
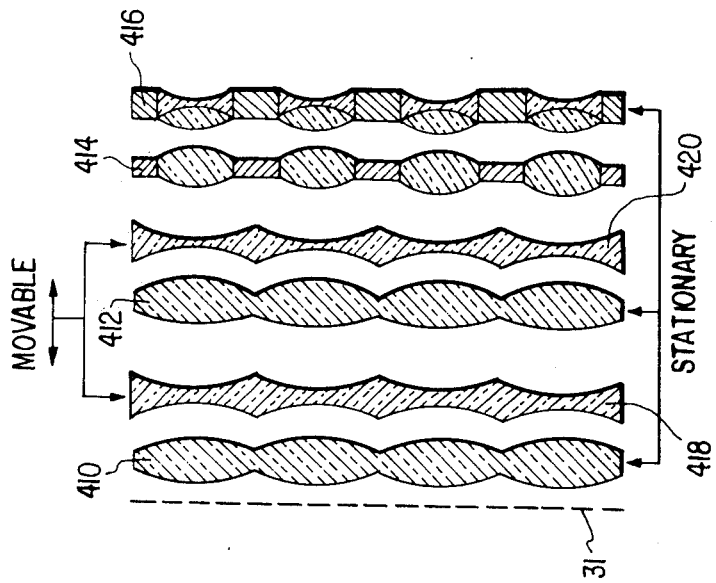
FIG. 14 is a partial schematic view of a zoom large lens array system.

Referring now to FIG. 12 of the drawings, a partial cross-sectional view of a triplet objective lens array appears. The triplet may be formed of three molded plastic sheets, an arrangement which yields economies in manufacturing. Of course, other materials such as glass may be employed as desired. It is well known to those skilled in the optic art that a triplet-type lens yields excellent images. As indicated, the flexible screen 31 may be positioned so that in the viewing stage it passes between any two of the three members 320, 322, 324 of the triplet. The screen 31 may also be positioned to the right or to the left of the assemblage. FIG. 13 shows an array of objective lenses configured to yield a reverse telephoto array having the advantage of very short back focal lengths. At FIG. 14 still another embodiment of the objective lenses is illustrated. FIG. 14 indicates schematically a zoom-type objective-lens system which includes six sheets of objective lenses, the system having four stationary sheets and two movable sheets. Such a zoom-type system yields a compact camera-viewer exhibiting particular utility in the eight-mm movie camera field. As in conventional camera devices, the assembly of objective lenses of this invention, in any of the embodiments, may be made as a detachable component. Of course, the zoom system is advantageous in that a wide range of focal lengths is possible without changing lenses.

Figure 15:
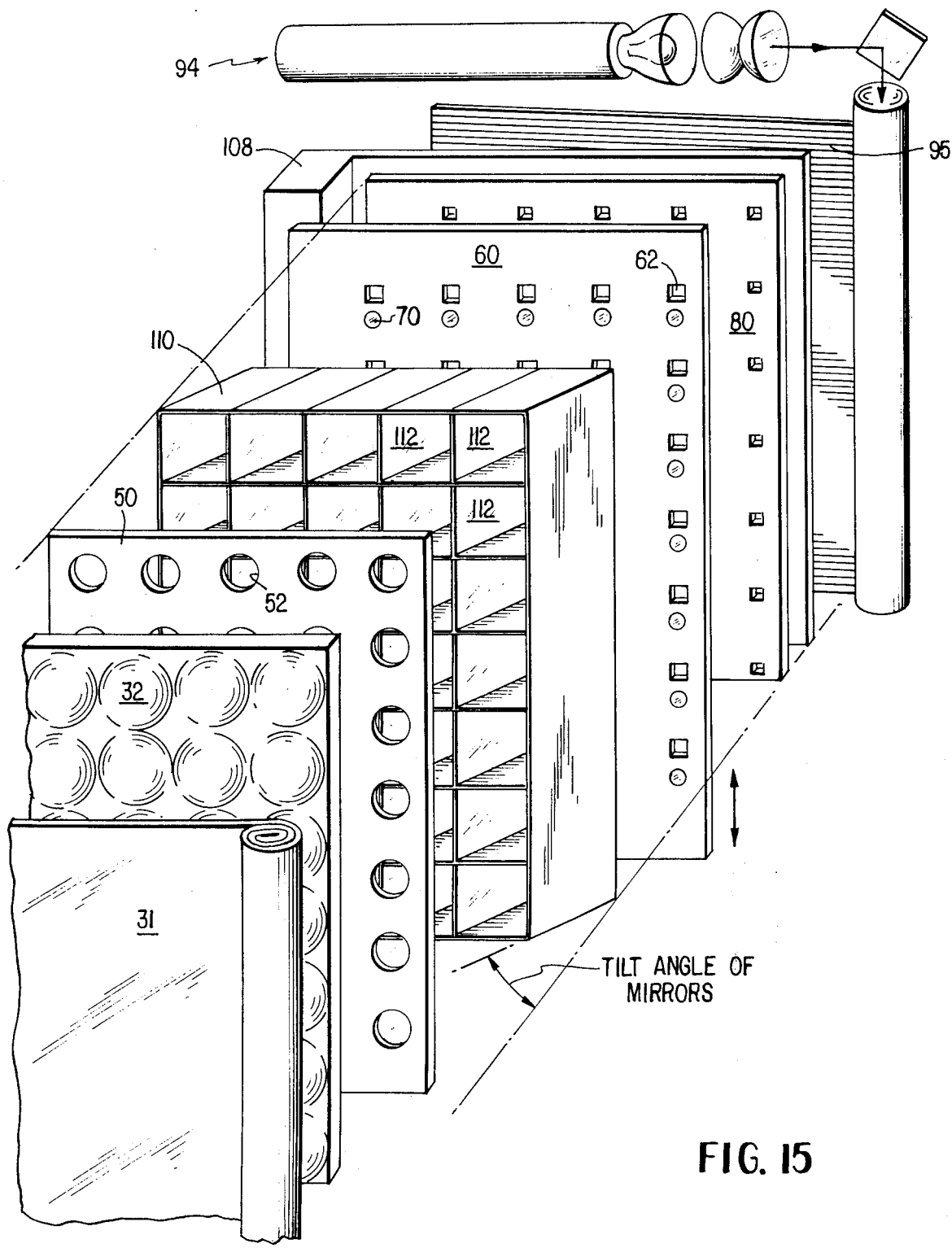
FIG. 15 is a view similar to FIG. 1 and shows an apparatus such as FIG. 1 with the addition of mirrors which fold certain light cones for the purpose of diminishing the thickness of the entire apparatus.
Figure 17:
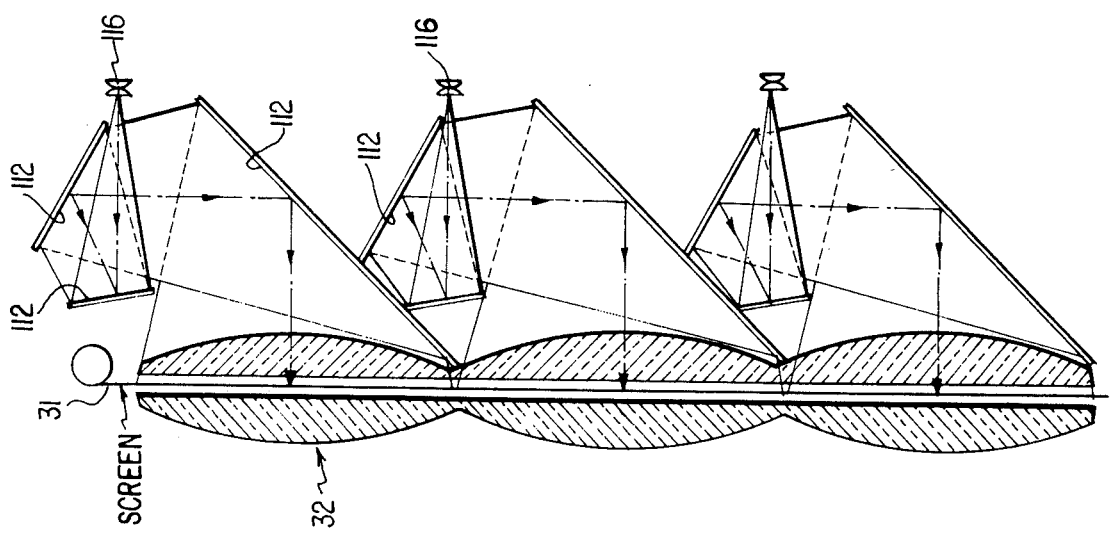
FIG. 17 is a partial schematic view illustrating three folding or reflecting steps for light cones, as may be used in the embodiment of FIG. 15.
Figure 16:
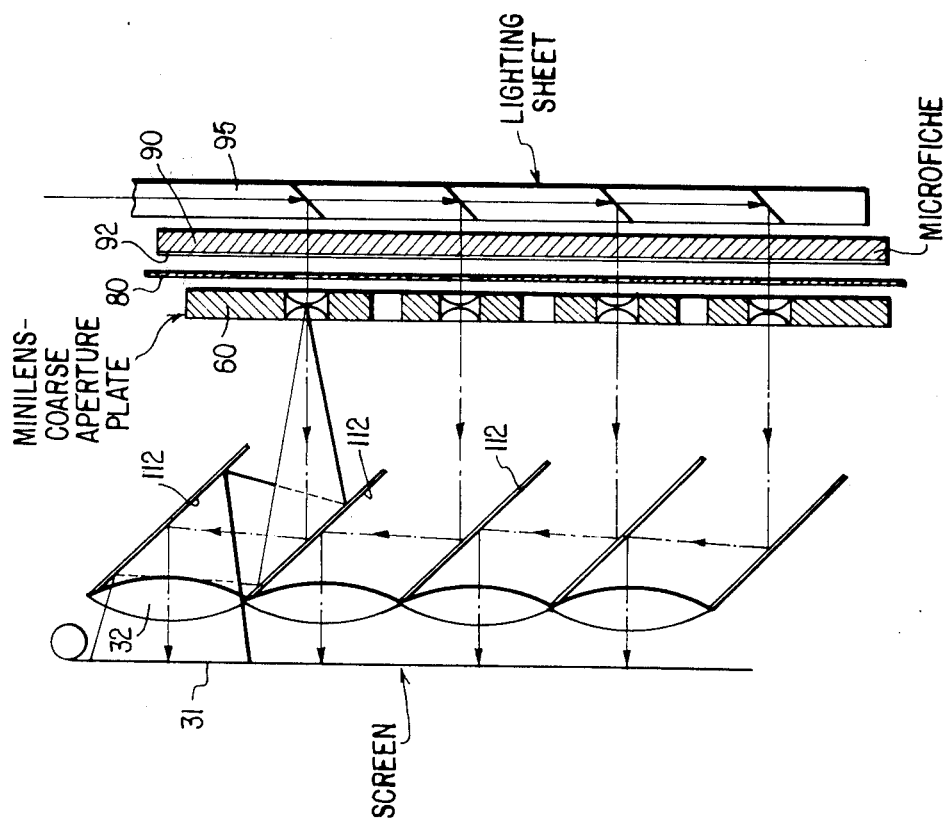
FIG. 16 is a schematic view illustrating an example of two folded light cones and shows the action of the folding of light cones of the embodiment of FIG. 15.

Referring now to FIG. 15 of the drawings, there is shown an arrangement employing folding mirrors for the purpose of decreasing the thickness of the device. The concept of employing mirrors to fold light rays, the mirrors termed folding mirrors, is set out in my co-pending application Ser. No. 612,862, filed Sept. 12, 1975, hereby incorporated by reference. In FIG. 15, the camera-viewer is provided with mirrors denoted generally by the numeral 112 and arranged in a stacked assemblage denoted by the numeral 110. The mirrors effect a double folding of light cones. FIGS. 16 and 17 further illustrate the folding-mirror arrangement as applied to the present invention in the viewing stage.

Figures 18, 19:
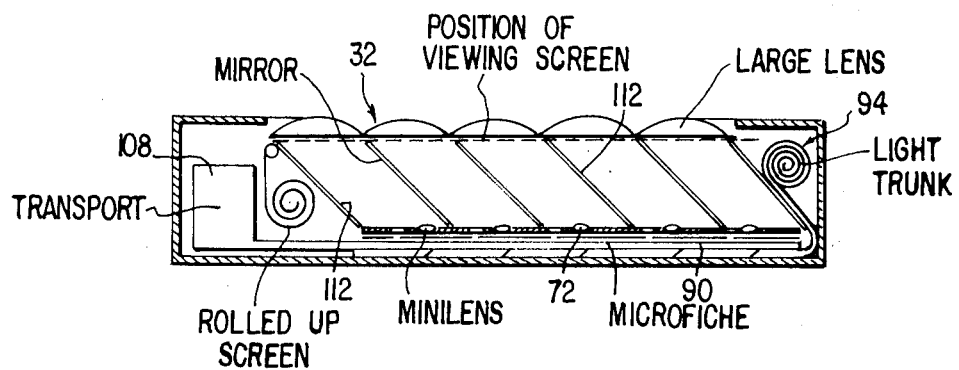
FIG. 18 is a cross-sectional view, partially schematic, of the combination camera and projector of this invention.
FIG. 19 is a partially schematic elevational view of a one-tier apparatus according to this invention which employs a Philips-type cassette film.

At FIG. 18, there is shown a cross-section of a typical assembled minilens camera-viewer device constructed in accordance with the practice of this invention. Attention of the reader is directed to the compact size and relatively large recording and viewing area of the device.

Figure 20:
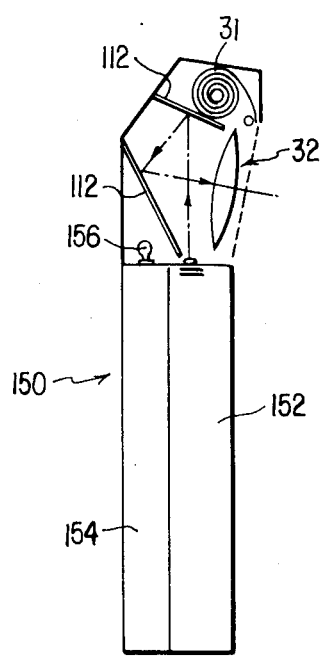
FIG. 20 is a view illustrating a typical cross-section of the apparatus of FIG. 19.
Figure 21:
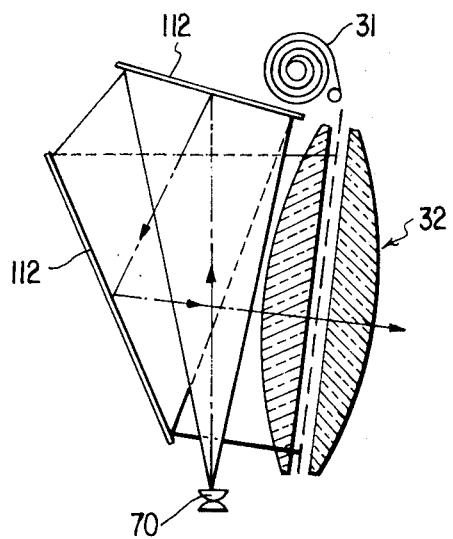
FIG. 21 is a partially schematic view illustrating a portion of the elements shown at FIG. 20, yet on a magnified scale and illustrating an embodiment.

Referring now to FIG. 19 of the drawings, an elevational view is shown in a one-tier camera-viewer 150 constructed in accordance with this invention which employs a so-called Philips cassette. The use of a Philips cassette in conjunction with folding mirrors has been set forth in my co-pending application Ser. No. 624,253, filed Oct. 20, 1975, and entitled "Film Strip Recorder and Viewer". The cassette reels are denoted as 151 and 153, and the film wound thereon as 155. At FIG. 20, a cross-sectional view of the device shown at FIG. 19 is illustrated and further demonstrates the compact nature of the construction. FIG. 21 is a typical cross-section at the upper portion of the device. Note that in this case the viewing screen, as earlier indicated, may be positioned between two plano-convex lenses.

Figure 23:
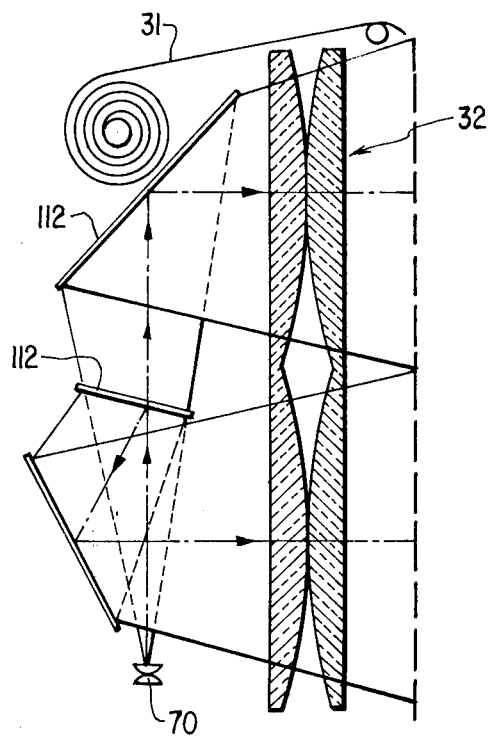
FIG. 23 is a schematic view of an optical arrangement which may be employed in a two-tier apparatus.
Figure 22A:
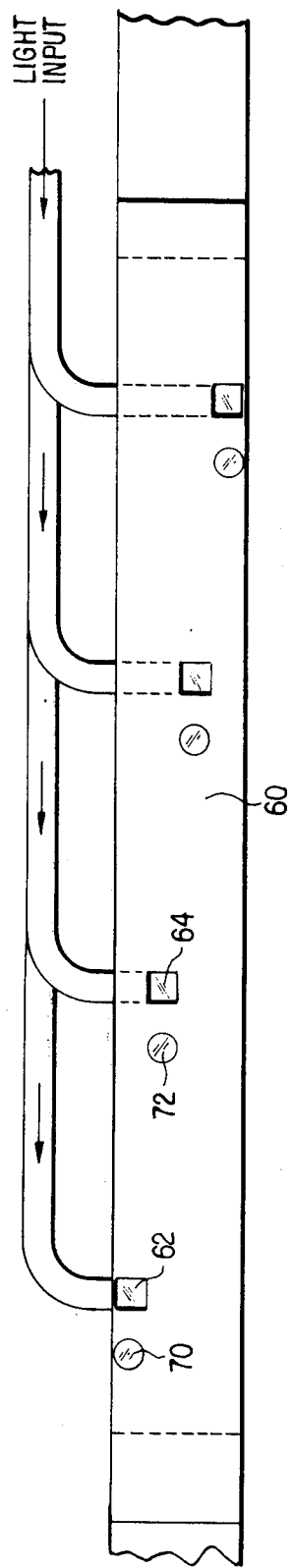
FIGS. 22a and 22b illustrate the relationship between a certain lens-carrying, coarse-aperture strip and fine-field-stop-strip and cassette film and lighting strip for a one-tier apparatus.
Figure 22B:
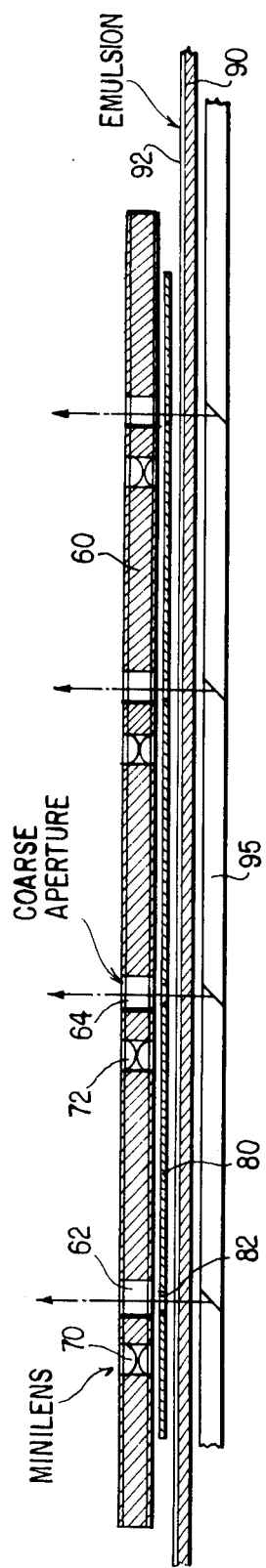
Figure 24:
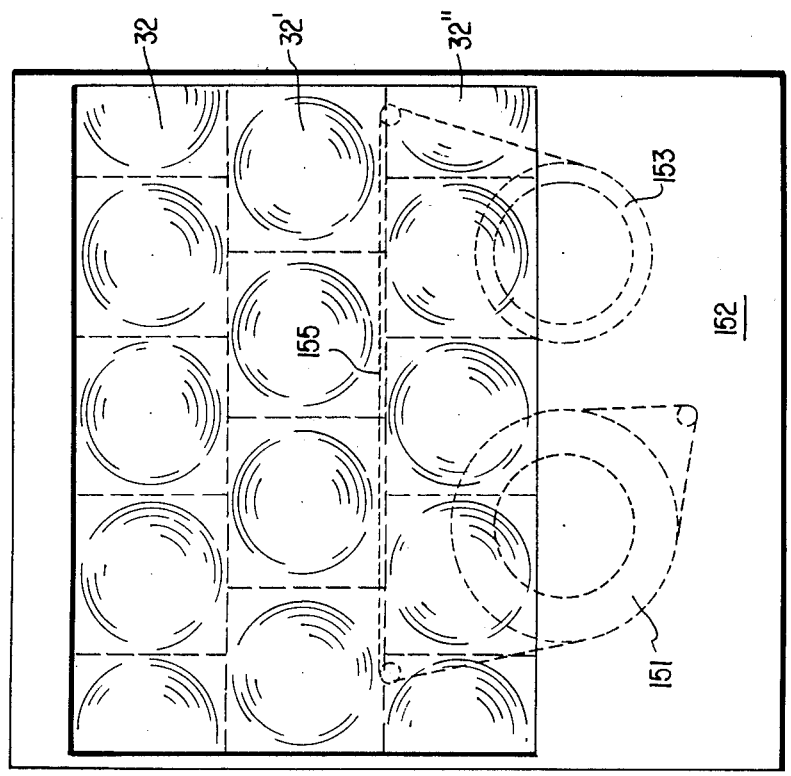
FIG. 24 is a view similar to FIG. 19 but shows three tiers employed instead of a single tier.

FIGS. 22a and 22b are partially schematic views of a lighting and lens strip which may be used in a construction such as shown at FIG. 19. Although the forms of the elements are different from those previously described, corresponding numerals for corresponding elements are employed. The lens and lighting strip may be fashioned directly into the Philips cassette itself so that dust is kept away from the film in the cassette and proper registry always maintained. For the case of a movable mililens strip, provision for engagement of such strip is required. At FIG. 23, a partially schematic view is given of the optical arrangement at the upper portion of a two-tiered camera-viewer system which permits pictures of an area 2 by 4 inches to be taken and projected. FIG. 24 is a partially-schematic elevational view, similar to FIG. 19, of a three-tiered cassette type compact viewer according to this invention. This permits even larger viewing areas such as 3 by 4 inches. FIG. 25 is a partial transverse cross-sectional view of the upper portion of the apparatus shown at FIG. 24 and further illustrates the optical arrangement of parts.

Figure 26:
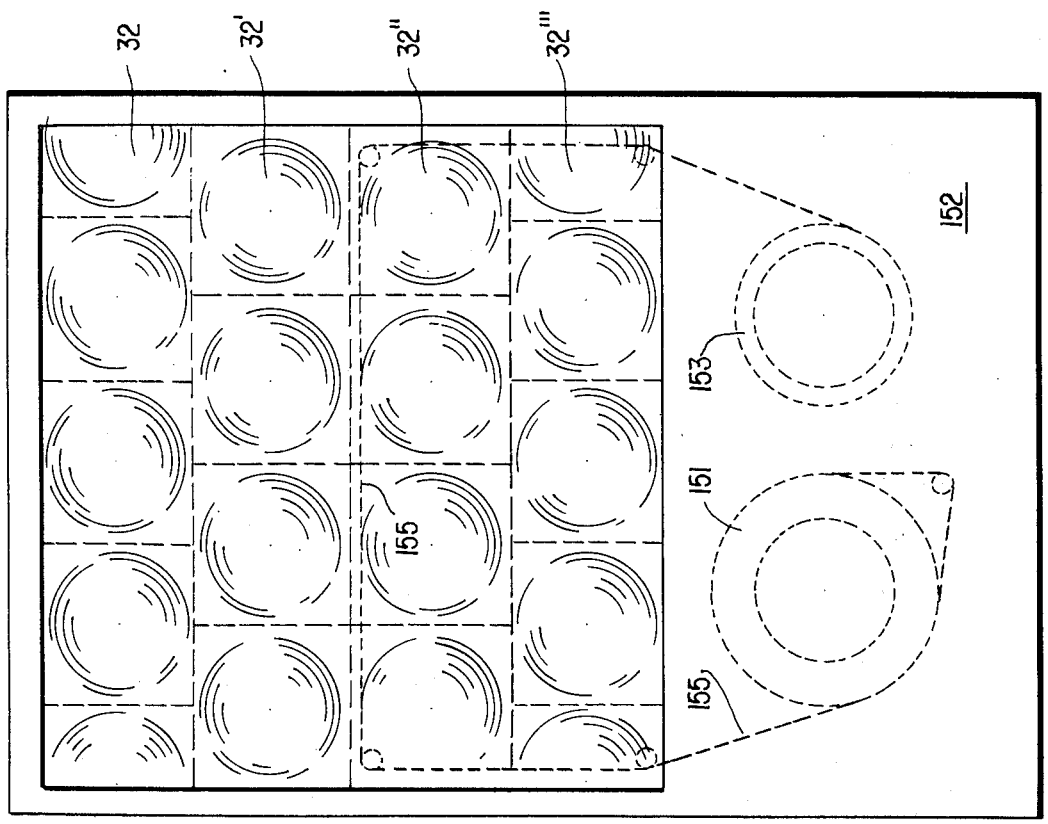
FIG. 26 is a view similar to FIG. 24 but illustrates a four-tier system.

FIG. 26 is a view similar to FIG. 24, and illustrates a four-tiered compact viewer system according to this invention. Details of the optical arrangement of the embodiment of FIG. 26 are shown at FIG. 27.

Figure 28:
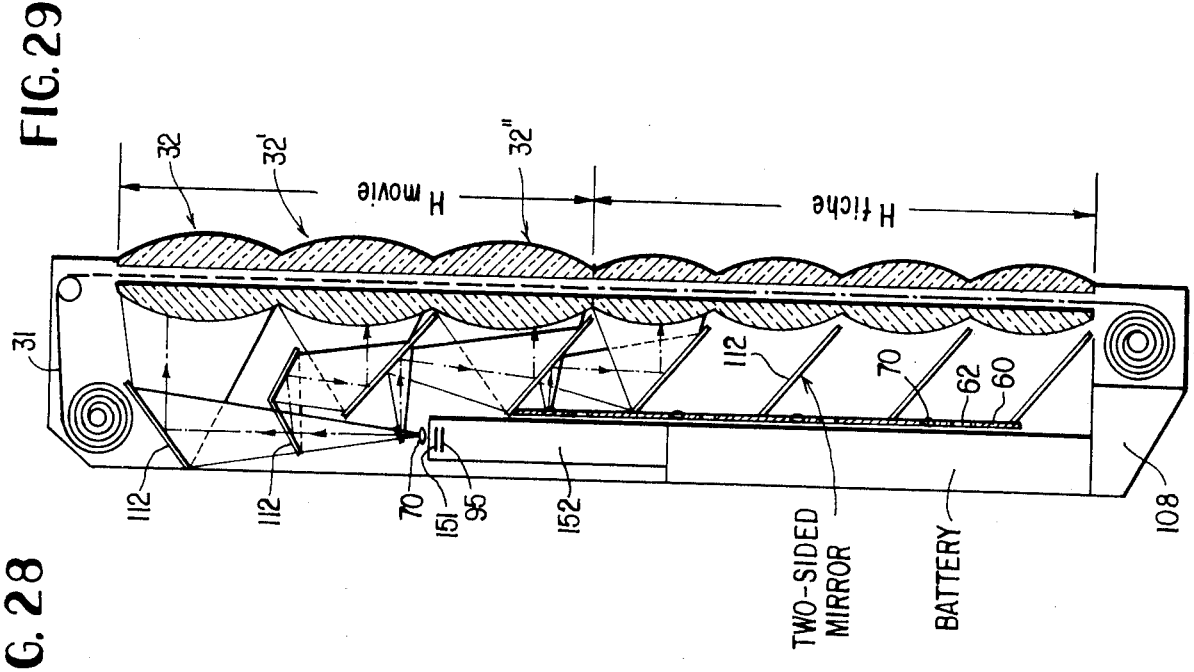
FIG. 28 is an elevational view illustrating an embodiment which employs both a Philips-type cassette camera and projector on the upper portion and a fiche-type camera and projector for the lower portion.
Figure 29:
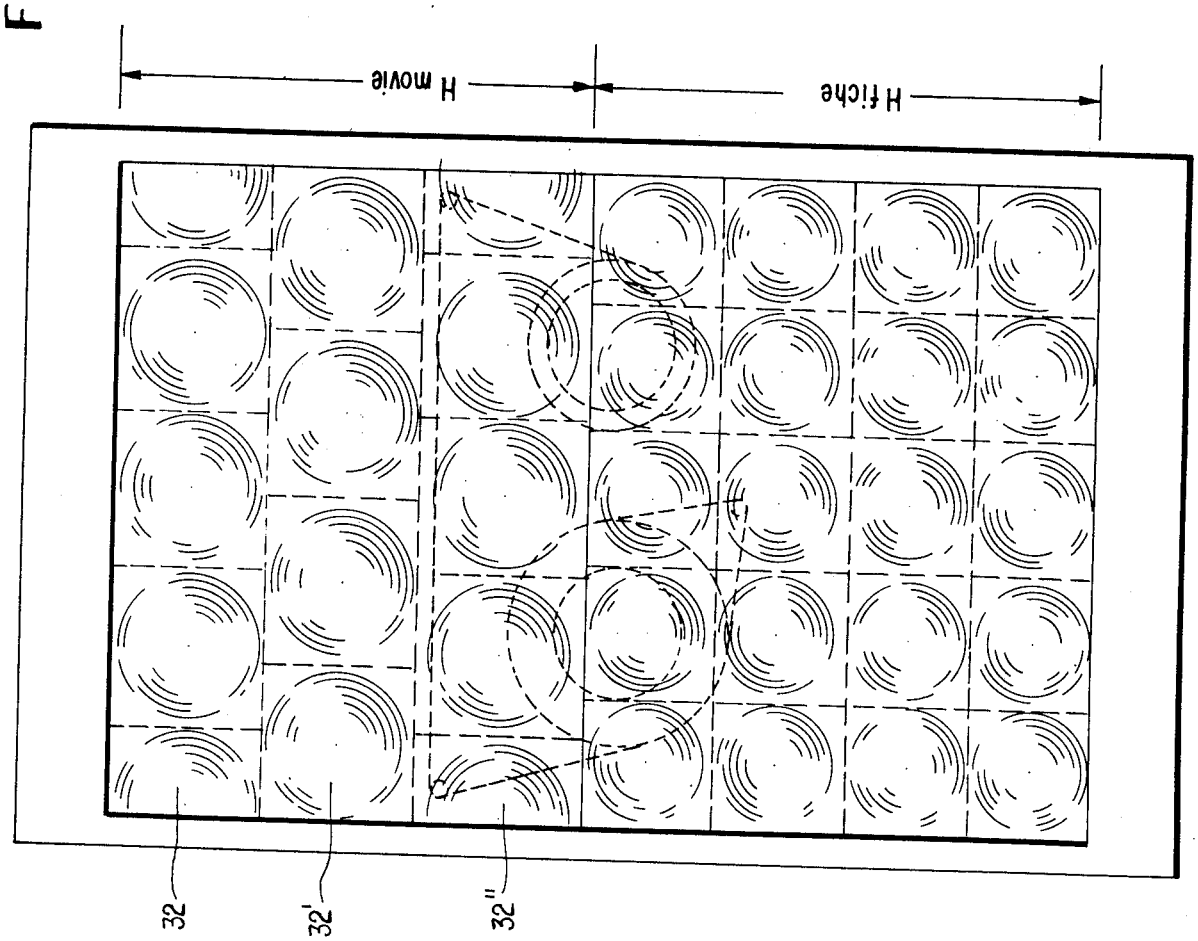
FIG. 29 is typical cross-sectional view of the apparatus of FIG. 28.

FIG. 28 is a view of a combination cassette and microfiche viewer. As seen at FIG. 29 which is a transverse cross-sectional view of the device of FIG. 28, the top portion of the apparatus is adapted to be used as a cassette apparatus, while the lower portion as a microfiche apparatus. In both the upper and lower portions, mirrors 112 are employed to fold cones of light to thereby reduce the thickness of the apparatus.

FIGS. 28 and 29 illustrate an embodiment wherein information is recorded in compact form both in cassette-film form and in sheet form where the scenes to be recorded may be remote from the camera, i.e., as in a conventional camera. The recordation may be made only of information located at the plane of the viewing screen. In that case, pictures cannot be made of mountain scenes or of a person located some distance away. In another mode of use, pictures may be taken on a microfiche. In yet another mode, recordation is made on a cassette film. In a final mode, both microfiche and cassette film may be employed. In each of these modes, it will be noted that pictures may be viewed from either microfiche or cassette film.

The use of black and white photographic emulsion for color has been set forth in several of my previous patents. One way of carrying this out, i.e., a manner of obtaining both color readout and recordation by using only black-and-white film, is the use of a three-sided prism 200 wherein each side is coated with a different primary color such as red (R), green (g), and blue (B). This is shown in my U.S. patent application Ser. No. 474,790, and also at FIGS. 30a, 30b and 30c of the drawings. The effect is to generate three distinct images on the photographic emulsion. The location of the prisms 200, mounted on scene mask 60, coincides with the fine aperture openings of mask 80. Upon projection or readout, a triad of minilenses 25, 26, 27, each covered with a transmission filter of a different primary color such as red, green, blue, is centered over appropriate microimages on the microfiche. A sheet may be molded which contains integrally the three-sided prisms and minilenses. Another method of achieving color is to take three successive exposures of the same scene, but each time with a different color filter positioned between the emulsion and the lens. Then, the black and white film is stepped three times in order to generate a single color image on the scene while viewing.

Still a third method for achieving color is by using redundancy as explained in my U.S. patent application Ser. No. 515,343, see FIG. 16. Here, the image is accepted by the fine aperture in mask 80 in the camera or taking phase and is three times larger than usual and when projected back up on the screen in the viewing phase extends over a distance 3d in the Y-direction. In brief, only one minilens per cell is employed in the viewing phase but it services three optical cells.

Figure 31A:
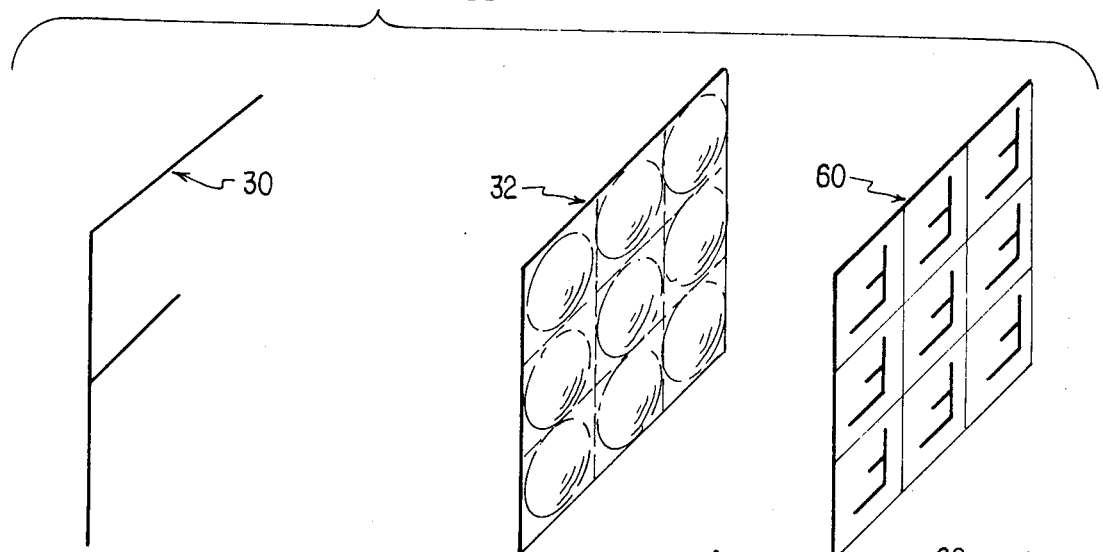
FIGS. 31a and 31b illustrate the effect of rotating the fiche of FIG. 1 upon the projected image as seen on the rear projection screen.
Figure 31B:
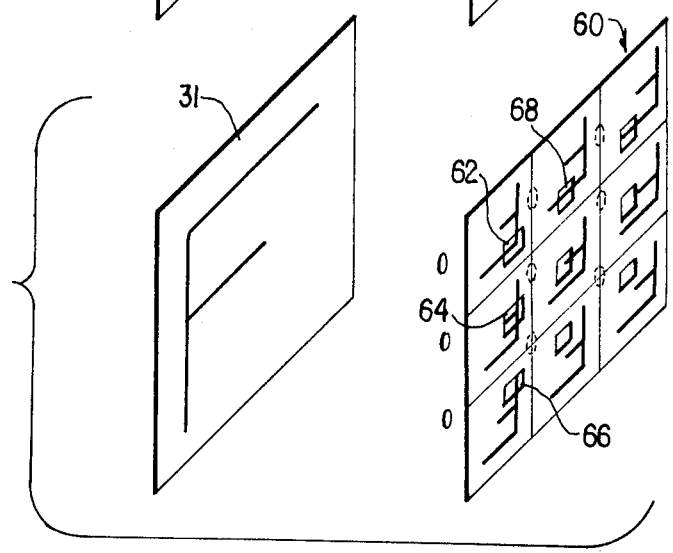

Reference now to FIGS. 31a, 31b and 32 will illustrate that the fiche 90 must be turned around for viewing upon projection or readout. The object 30 is shown to be the letter F, being a typical asymmetrical object. In the recording or camera phase, as shown at FIG. 31a, the large lens array 32 will form a plurality of inverted and right-to-left images on plage 60. Assume now that this object has been photographed and the emulsion developed and placed back into the apparatus without turning it around. As indicated at FIG. 31b, subsequent projection would result in the object appearing on viewing screen 31 as indicated. However, the viewer is on the other or left side of screen 31 and would see the letter F with a right-to-left inversion. This would clearly not be acceptable. Accordingly, as indicated at FIG. 32, if the fiche 90 is turned around prior to projection, then the right face of screen 31 will show a right-to-left inverted figure, but because the screen is a rear projection screen, the viewer on the other side or left side of the screen will see the correct reconstruction.

In the event that a cassette film is employed, as in the customary Philips-type cassette, the same problem of proper left-to-right readout is encountered. At FIG. 33a a schematic representation of a cassette film with four successive frames is illustrated. In the taking or recording process, the circles around the first frame bearing 1 denote the places on the cassette film where the sub-images strike it. Here, there are four such sub-images for purposes of illustration. FIG. 33b illustrates the turning over of the cassette film for playback or readout, i.e., where projection against the rear viewing screen takes place. However, the reader will note that the minilenses are not aligned with the developed microimages on the emulsion of the cassette film. FIG. 33c illustrates a rotation, through a slight angle, of coarse aperture plate 60, so as to align the minilenses with the developed microimages in the cassette film emulsion. While no illustration corresponding to FIG. 1 has been given wherein a cassette film is employed in lieu of the fiche-type film designated by the numeral 90 of FIG. 1, it is believed apparent from the proceeding explanation how such a construction would be carried out.

As an alternative to the method indicated at FIGS. 33a, 33b, 33c to obtain proper right-left positioning for readout on the rear projection screen, the minilens strip may be molded in such a manner that the minilenses are properly operative in the viewing phase. This is illustrated at FIG. 34 of the drawings.

Referring now to FIG. 35, an embodiment is illustrated which employs a closed loop of microfiche denoted by the numeral 115a. The numeral 220 denotes schematically a sponge-like element which holds known developing fluids for rapidly developing the flexible microfiche 155a after exposure. The other elements of the device are indicated and correspond completely with those previously described.

FIG. 36 is a partially-schematic front-elevational view of a cassette 152 similar to the cassette of FIG. 19, with the addition of a sponge-like material 222 for holding photographic development fluids for rapidly developing the film strip 155 carried by the Philips cassette.

Referring now to FIG. 37 of the drawings, another embodiment is illustrated wherein there is direct left-to-right correct symmetry in the reading or projection stage. The large lens array 32 receives light from an object to be photographed and the folding mirrors on the left side of the apparatus, all denoted by the numeral 112, as before, direct a light through the fine apertures in the field-stop plate 80 and directly onto emulsion 92 of microfiche 90. After development, the microfiche 90 is returned to the position indicated at FIG. 37 for projection. Any suitable source of illumination, such as a Grunberger sheet or, more simply, placing a source of illumination to the left of lens plate 32, illuminates the microimages on emulsion 92 for projection through minilens elements 70 and onto the viewing screen upon reflection from the several folding mirrors 112 on the right side of the apparatus.

What is claimed is:

1. An optical apparatus for use as both a projector and camera, including,
   a. a generally planar array of objective lenses,
   b. an opaque scene mask, said mask being at a distance from said lenses equal to the image distance of said lenses,
   c. septa extending from said objective lenses to said scene mask, said septa defining cells, the septa forming with their intersection with said scene mask a plurality of identical zones on said scene mask, each zone corresponding to a single lens of the array,
   d. said scene mask having apertures, there being an aperture for, and corresponding to, each of said objective lenses and to each of said zones, the optic axis of each objective lens intersecting a corresponding, single one, of said zones on said scene mask, the apertures of said scene mask being non-homologously positioned with respect to the said zones of the scene mask so that no two apertures of said scene mask have the same homologous position in their respective zones,
   e. a lens mounted in said scene mask corresponding to, yet not within, each said aperture,
   f. a field-stop plate having apertures therein corresponding to, and being optically aligned with, the apertures in the scene mask, said field-stop plate parallel to, and positioned on, the side of said scene mask remote from said objective lenses, g. said scene mask movable between a first position wherein the objective lenses, the scene mask openings, and the field-stop plate openings are optically aligned, and a second position wherein the objective lenses, the scene mask lenses, and the field-stop plate openings are optically aligned.

2. The apparatus of claim 1 wherein the insersection of the optic axis of each objective lens with its corresponding zone on said field-stop plate is at the center of the zone.

3. The apparatus of claim 1 wherein the intersection of the optic axis of each objective lens with its corresponding zone on said field-stop plate is at the center of the said aperture corresponding to, and positioned within, each zone.

4. The apparatus of claim 1 including a photographic emulsion parallel to said field-stop plate, said emulsion adapted to receive light from said objective lenses when said scene mask openings are aligned with the objective lenses and the openings of the field-stop plate.

5. The apparatus of claim 1 including means for projecting light through said field-stop plate openings toward the objective lenses.

* * * * *